(12) United States Patent
Matsuda et al.

(10) Patent No.: US 11,356,991 B2
(45) Date of Patent: Jun. 7, 2022

(54) WIRELESS COMMUNICATION DEVICE, WIRELESS COMMUNICATION METHOD, AND COMPUTER PROGRAM

(71) Applicant: Sony Corporation, Tokyo (JP)

(72) Inventors: Hiroki Matsuda, Tokyo (JP); Kazuyuki Shimezawa, Kanagawa (JP); Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 16/474,065

(22) PCT Filed: Dec. 14, 2017

(86) PCT No.: PCT/JP2017/044869
§ 371 (c)(1),
(2) Date: Jun. 27, 2019

(87) PCT Pub. No.: WO2018/128065
PCT Pub. Date: Jul. 12, 2018

(65) Prior Publication Data
US 2019/0349905 A1  Nov. 14, 2019

(30) Foreign Application Priority Data
Jan. 5, 2017  (JP) .............................. JP2017-000588

(51) Int. Cl.
*H04W 72/04* (2009.01)
*H04W 92/10* (2009.01)

(52) U.S. Cl.
CPC .......... *H04W 72/042* (2013.01); *H04W 92/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 2016/0234754 | A1* | 8/2016 | Baghel | H04W 72/1289 |
| 2017/0013628 | A1* | 1/2017 | Kim | H04W 56/002 |
| 2017/0019882 | A1* | 1/2017 | Nimbalker | H04W 72/042 |
| 2017/0019886 | A1* | 1/2017 | Patel | H04W 76/14 |
| 2017/0079016 | A1* | 3/2017 | Nord | H04W 72/1226 |

(Continued)

FOREIGN PATENT DOCUMENTS

| | | |
|---|---|---|
| JP | 2015164260 A | 9/2015 |
| JP | 2015-531220 A | 10/2015 |

(Continued)

OTHER PUBLICATIONS

International Search Report and Written Opinion dated Jan. 23, 2018 for PCT/JP2017/044869 filed on Dec. 14, 2017, 18 pages including English Translation of the International Search Report.

(Continued)

*Primary Examiner* — Yee F Lam
(74) *Attorney, Agent, or Firm* — Xsensus LLP

(57) ABSTRACT

A wireless communication device including an acquisition unit that acquires an information set related to a transmission parameter when transmitting a resource arbitrarily selected from a predetermined resource pool to a transmission target (for example, performing grant-free transmission), and a setting unit that sets the transmission parameter using the information set.

10 Claims, 25 Drawing Sheets

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| : | : | : | : | : | : | : | : |

(56) References Cited

U.S. PATENT DOCUMENTS

| | | | | |
|---|---|---|---|---|
| 2017/0150480 | A1* | 5/2017 | Kim | H04W 8/005 |
| 2017/0188391 | A1* | 6/2017 | Rajagopal | H04W 74/0816 |
| 2017/0223699 | A1* | 8/2017 | Yasukawa | H04W 76/14 |
| 2017/0265227 | A1* | 9/2017 | Wang | H04W 72/04 |
| 2018/0206140 | A1* | 7/2018 | Panteleev | H04W 72/044 |

FOREIGN PATENT DOCUMENTS

| | | |
|---|---|---|
| JP | 2016-528795 A | 9/2016 |
| JP | 2017522812 A | 8/2017 |
| WO | 2015/131827 A1 | 9/2015 |
| WO | WO-2016019545 A1 | 2/2016 |
| WO | 2016/142978 A1 | 9/2016 |
| WO | 2016/188489 A1 | 12/2016 |
| WO | 2017/016425 A1 | 2/2017 |

OTHER PUBLICATIONS

NTT Docomo, Inc., "SLS evaluation on uplink multiple access", 3GPP TSG RAN WG1 Meeting No. 86bis R1-1610077, Lisbon, Portugal, Oct. 10-14, 2016, pp. 1-12.

Intel Corporation, "Support of link adaptation for UL grant-free NOMA schemes", 3GPP TSG-RAN WG1 Meeting No. 86bis R1-1610374, Lisbon, Portugal, Oct. 10-14, 2016, pp. 1-4.

Ericsson, "Synchronization aspects for grant-free access", TSG-RAN WG1 Meeting No. 87 R1-1612957, Reno, Nevada, US, Nov. 14-18, 2016, 2 pages.

Extended European Search Report dated Dec. 12, 2019 in European Patent Application No. 17890557.6, 13 pages.

Huawei et al., "Discussion on grant-free transmission", 3GPP TSG RAN WG1 Meeting #86, R1-166095, Aug. 22-26, 2016, 5 pages.

* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

FIG. 11

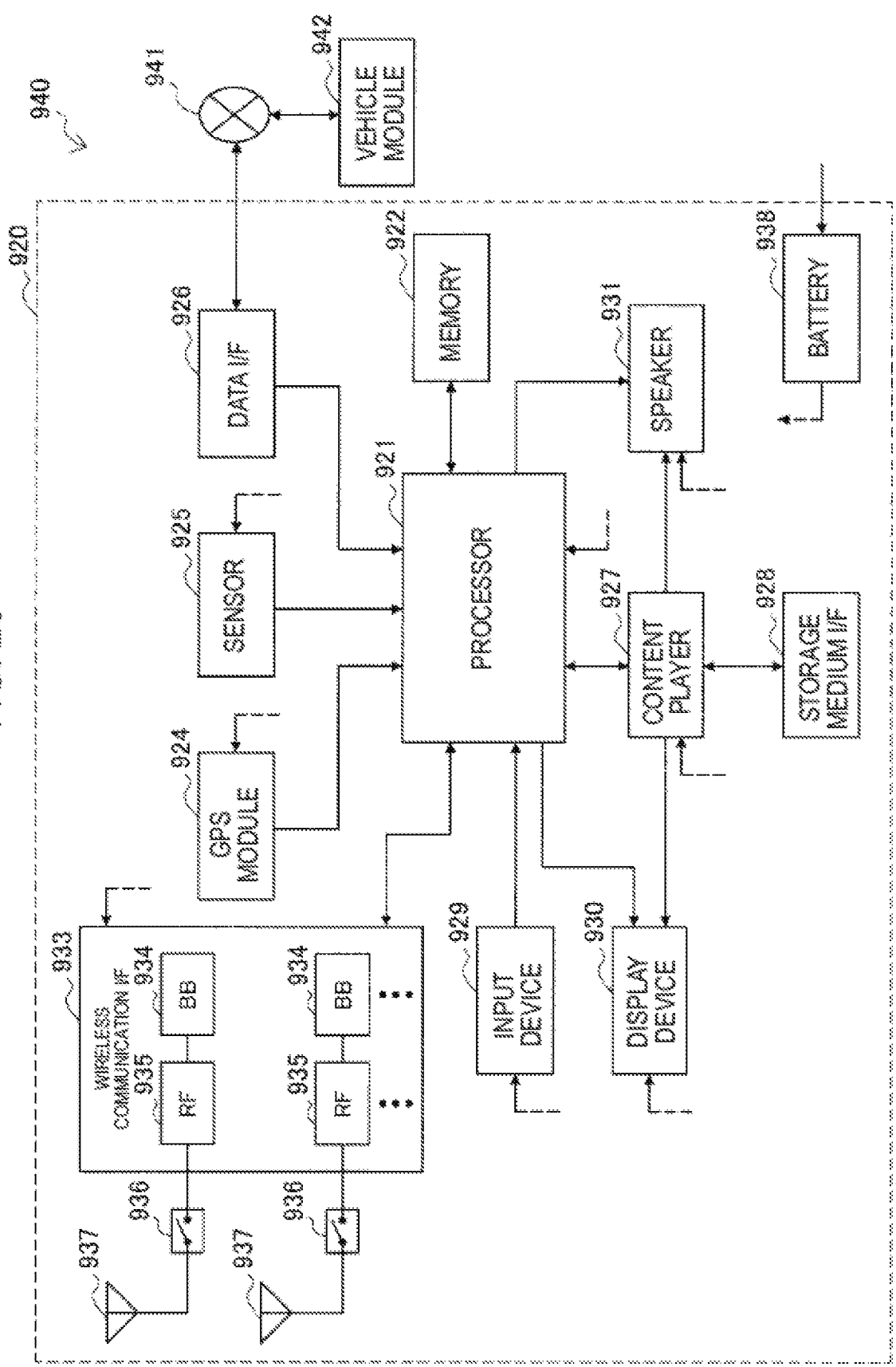

WIRELESS COMMUNICATION DEVICE, WIRELESS COMMUNICATION METHOD, AND COMPUTER PROGRAM

CROSS-REFERENCE TO RELATED APPLICATIONS

The present application is based on PCT filing PCT/JP2017/044869, filed Dec. 14, 2017, which claims priority to JP 2017-000588, filed Jan. 5, 2017, the entire contents of each are incorporated herein by reference.

TECHNICAL FIELD

The present disclosure relates to a wireless communication device, a wireless communication method, and a computer program.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. In NR, it is considered to reduce signaling between a base station device and a terminal device, and attention is being paid to the grant-free transmission technology as one of technologies for reducing signaling. Details of the grant-free transmission technology are disclosed in Non-Patent Literature 1.

CITATION LIST

Non-Patent Literature

Non-Patent Literature 1: Ericsson, R1-1612957, "Synchronization aspects for grant-free access," 3GPP, TSG-RAN WG1 #87, Nov. 14-18, 2016.

DISCLOSURE OF INVENTION

Technical Problem

The grant-free transmission technology is a technology in which a terminal device can make transmission without receiving a resource allocation instruction from a base station device. This technology allows signaling including a resource allocation instruction to be reduced. On the other hand, a parameter related to transceiving provided by signaling is no longer provided, so that it is difficult to appropriately set the parameter related to transceiving. However, in NR in which every request condition is required, it is strongly required to improve transmission efficiency by appropriately setting the parameter related to transceiving.

Accordingly, the present disclosure proposes a novel and improved wireless communication device, a novel and improved wireless communication method, and a novel and improved computer program capable of considerably improving transmission efficiency of an entire system by realizing flexible design in accordance with various use cases in a communication system in which a base station device and a terminal device communicate with each other.

Solution to Problem

According to the present disclosure, there is provided a wireless communication device including: an acquisition unit configured to acquire an information set related to a transmission parameter when transmitting a resource arbitrarily selected from a predetermined resource pool to a transmission target; and a setting unit configured to set the transmission parameter using the information set.

Further, according to the present disclosure, there is provided a wireless communication device including: a notification unit configured to notify a terminal device of an information set related to a transmission parameter when transmitting a resource arbitrarily selected from a predetermined resource pool to a transmission target; and a receiving unit configured to receive a signal transmitted from the terminal device on the basis of the transmission parameter having been set in the terminal device using the information set.

Further, according to the present disclosure, there is provided a wireless communication method, including: acquiring, with a processor, an information set related to a transmission parameter when transmitting a resource arbitrarily selected from a predetermined resource pool to a transmission target; and setting, with the processor, the transmission parameter using the information set.

Further, according to the present disclosure, there is provided a wireless communication method, including: notifying, with a processor, a terminal device of an information set related to a transmission parameter when transmitting a resource arbitrarily selected from a predetermined resource pool to a transmission target; and receiving, with the processor, a signal transmitted from the terminal device on the basis of the transmission parameter having been set in the terminal device using the information set.

Further, according to the present disclosure, there is provided a computer program for causing a computer to execute: acquiring an information set related to a transmission parameter when transmitting a resource arbitrarily selected from a predetermined resource pool to a transmission target; and setting the transmission parameter using the information set.

Further, according to the present disclosure, there is provided a computer program for causing a computer to execute: notifying a terminal device of an information set related to a transmission parameter when transmitting a resource arbitrarily selected from a predetermined resource pool to a transmission target; and receiving a signal transmitted from the terminal device on the basis of the transmission parameter having been set in the terminal device using the information set.

Advantageous Effects of Invention

According to the present disclosure, as described above, it is possible to provide a novel and improved wireless communication device, a novel and improved wireless communication method, and a novel and improved computer program capable of considerably improving transmission efficiency of an entire system by realizing flexible design in accordance with various use cases in a communication system in which a base station device and a terminal device communicate with each other.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

FIG. 11 is a diagram illustrating an example of downlink resource element mapping of NR according to the present embodiment.

FIG. 26 is a block diagram illustrating an example of a schematic configuration of a car navigation apparatus 920 to which the technology according to the present disclosure may be applied.

DISCLOSURE OF INVENTION

Figure 1:
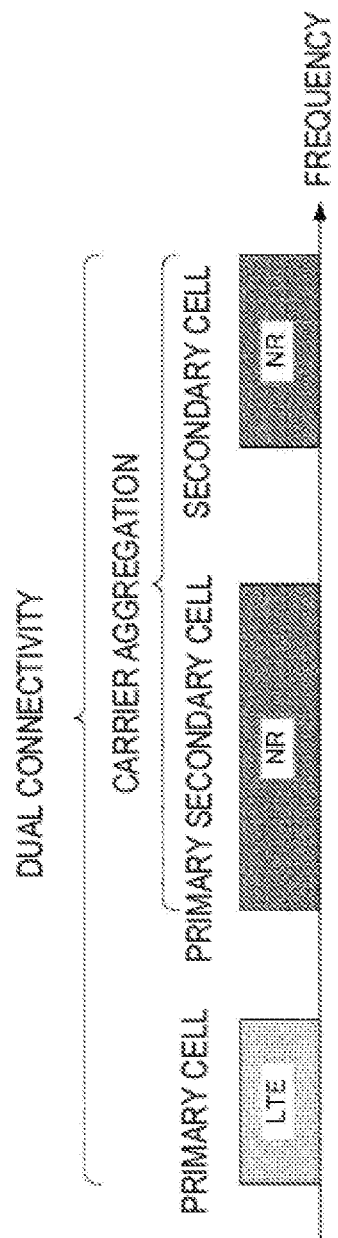
FIG. 1 is a diagram illustrating an example of setting of a component carrier according to a present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, technologies, functions, methods, configurations, and procedures to be described below and all other descriptions can be applied to LTE and NR unless particularly stated otherwise.

Note that the description will be made in the following order.

1. Embodiment of the present disclosure
2. Application examples
3. Conclusion

1. EMBODIMENT OF THE PRESENT DISCLOSURE

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
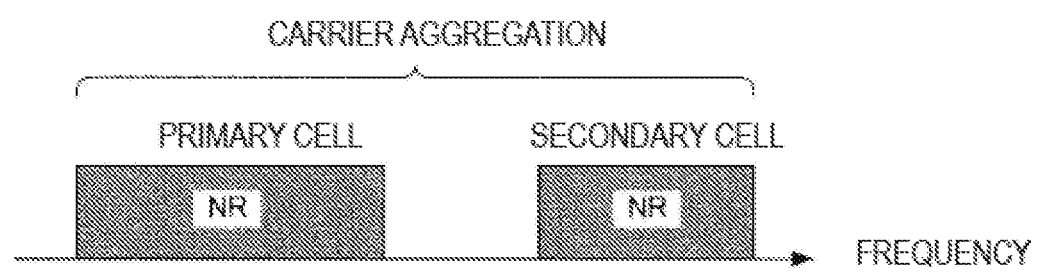
FIG. 2 is a diagram illustrating an example of setting of a component carrier according to a present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
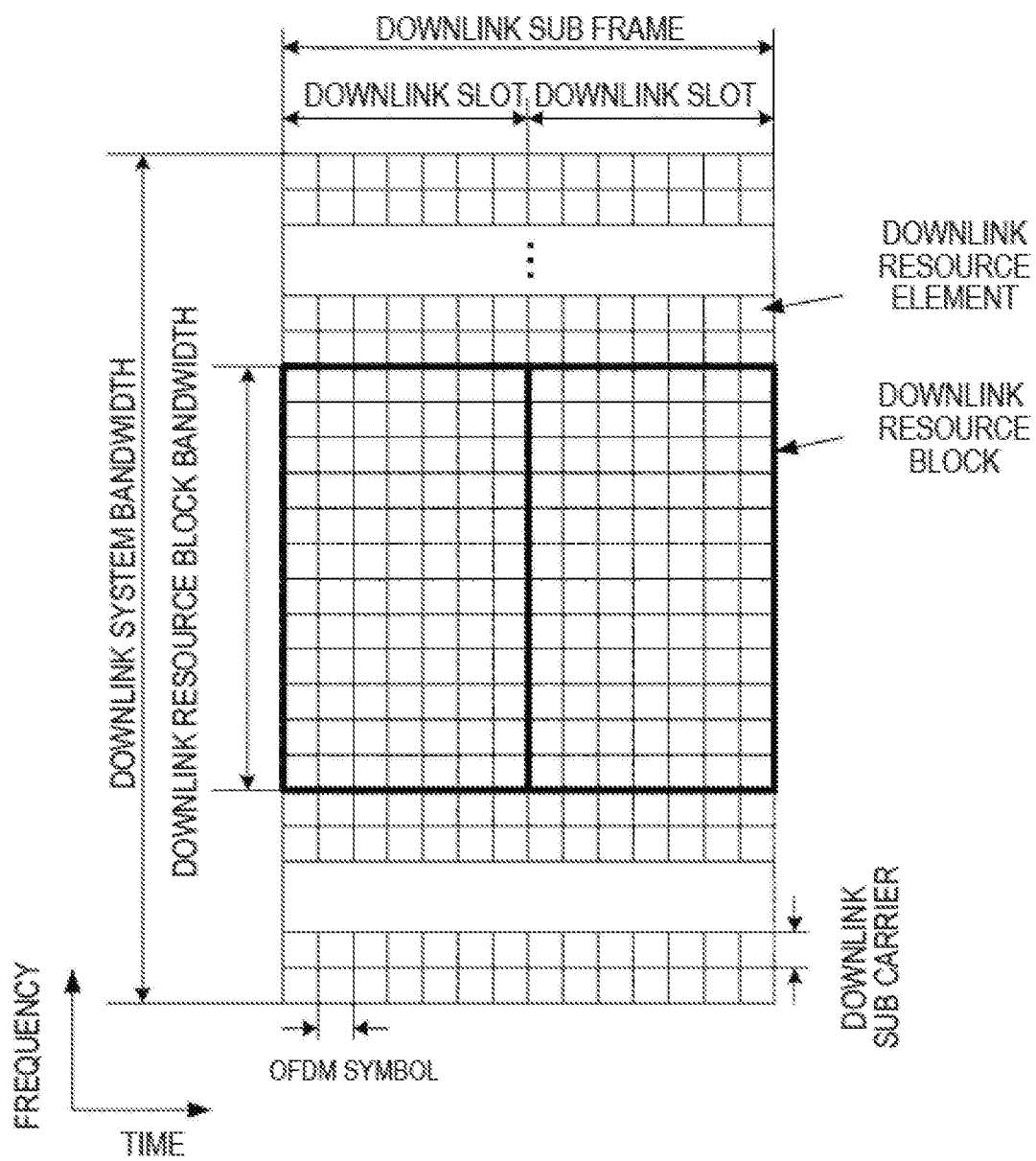
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
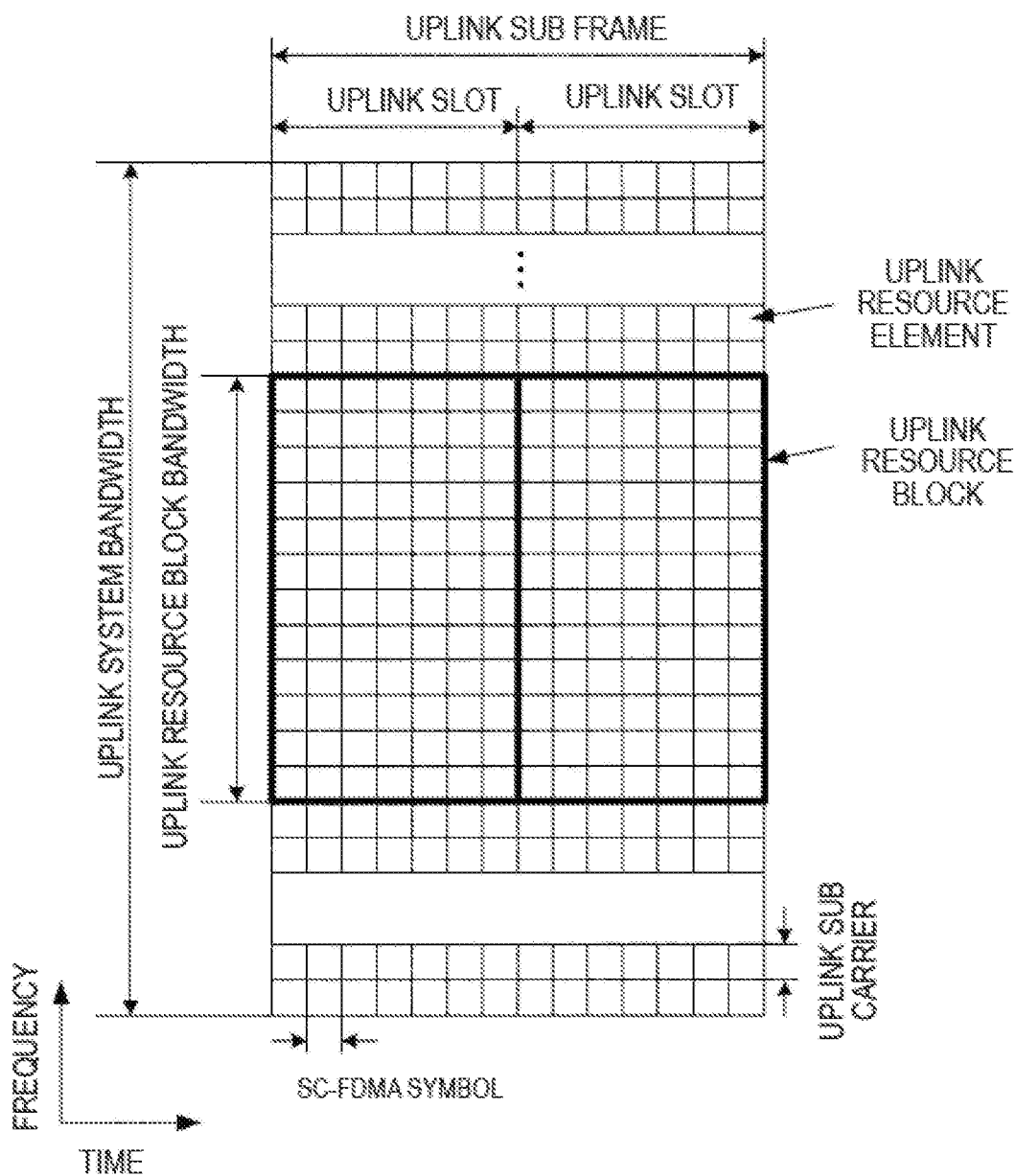
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to as simply a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters is used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
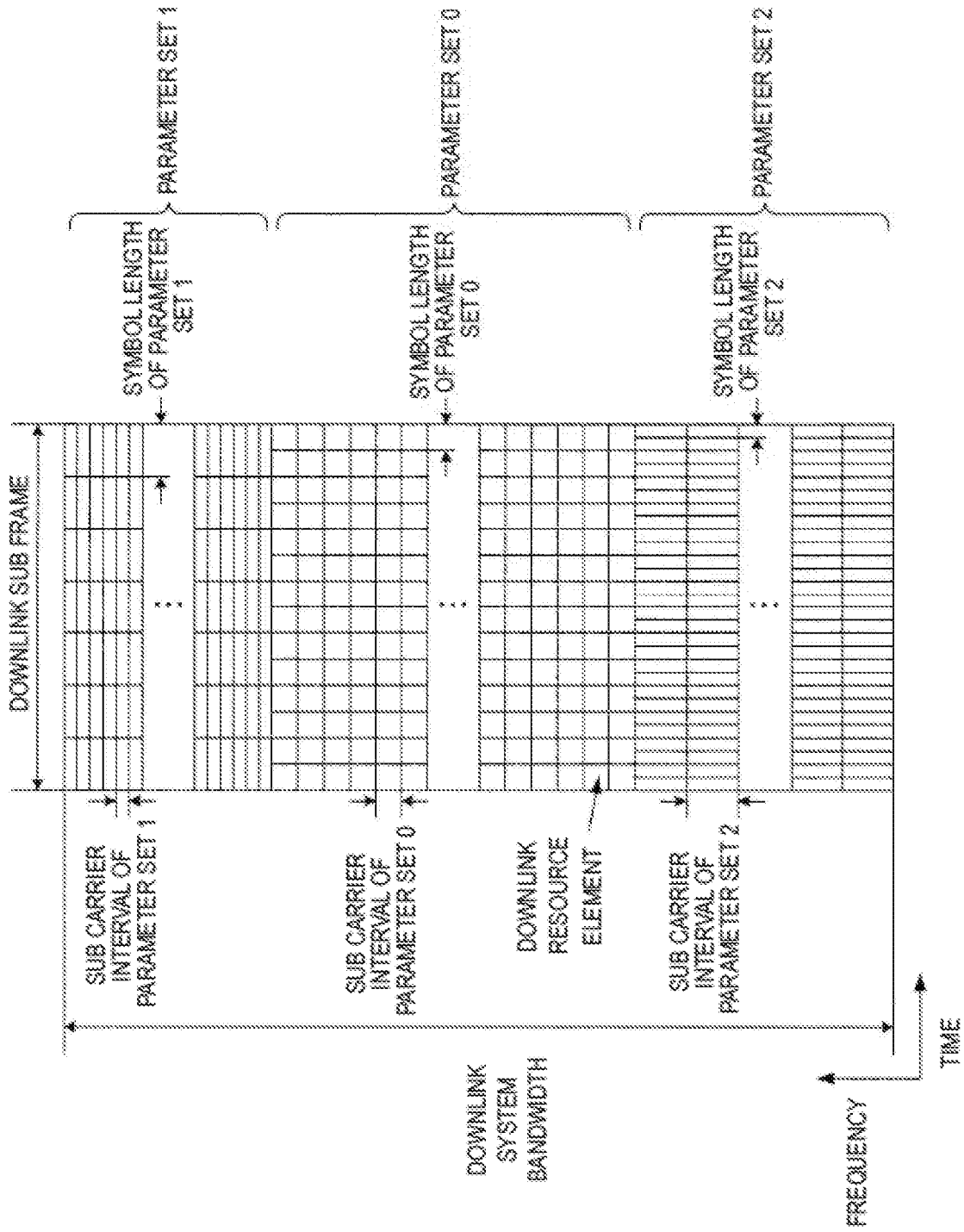
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
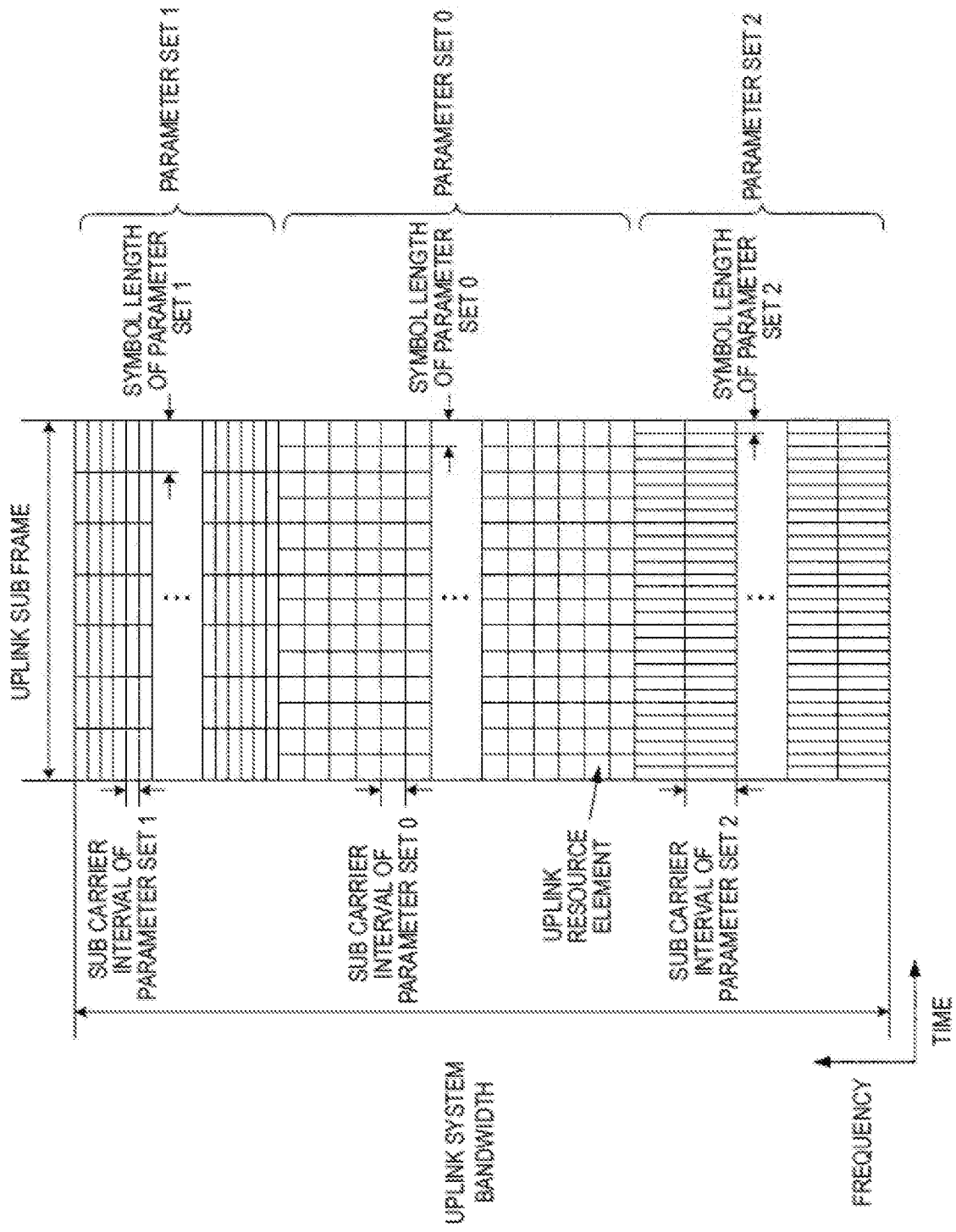
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the terminal device 2 receives the HARQ-ACK indicating ACK, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS may be transmitted with zero output power. In other words, the resources of the ZP CSI-RS may transmit nothing. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Configuration Example of Base Station Device 1 in Present Embodiment>

Figure 8:
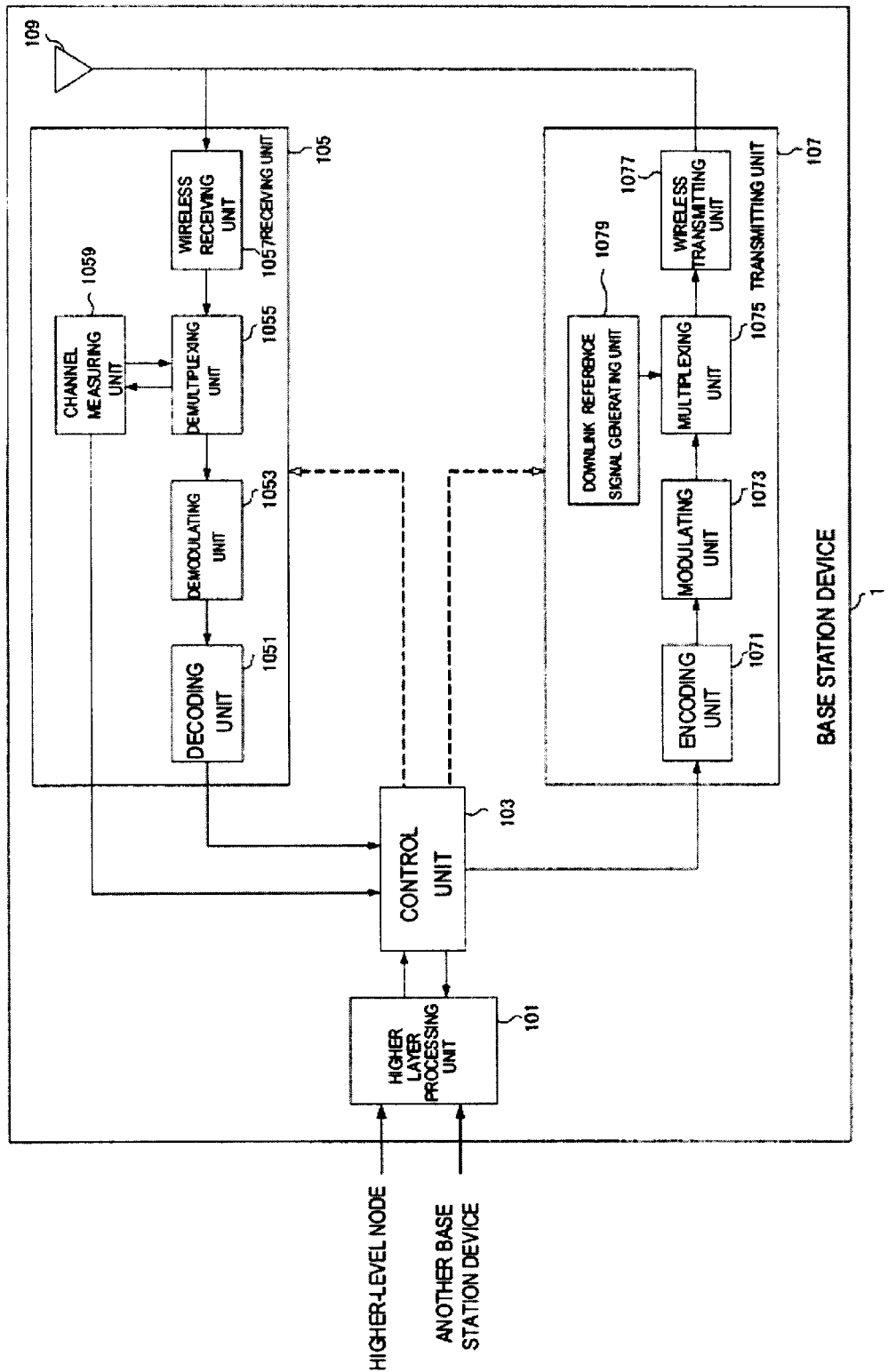
FIG. 8 is a schematic block diagram illustrating a configuration of a base station device of the present embodiment.

FIG. 8 is a schematic block diagram illustrating a configuration of the base station device 1 of the present embodiment. As illustrated, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Base Station Device 2 in Present Embodiment>

Figure 9:
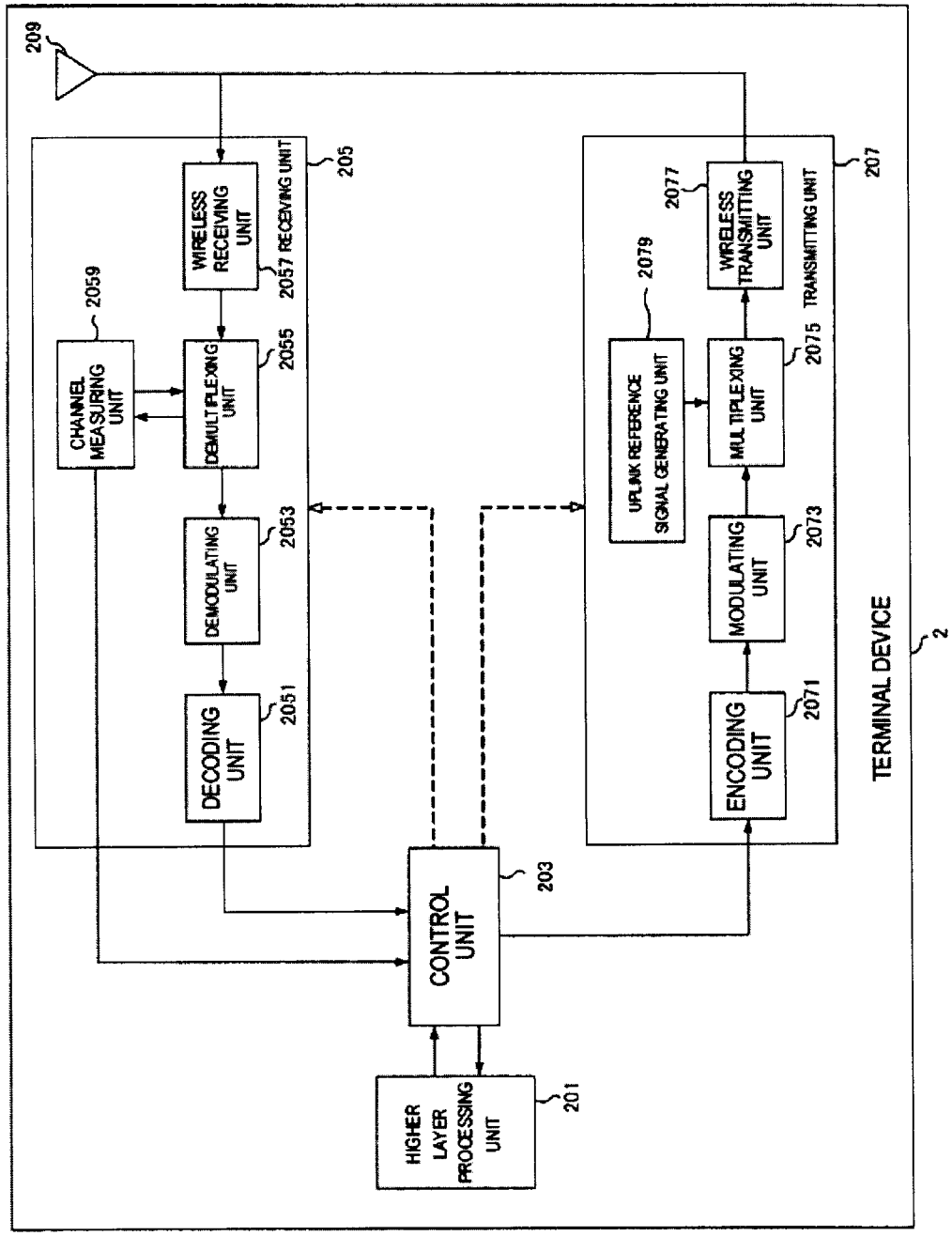
FIG. 9 is a schematic block diagram illustrating a configuration of a terminal device of the present embodiment.

FIG. 9 is a schematic block diagram illustrating a configuration of the terminal device 2 of the present embodiment. As illustrated, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes a setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG.

The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of sub frame and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N-1. For example, in a case in which the number of EREGs used in one ECCE is 4, the EPDCCH set constituted by 4 RB pairs constitutes 16 ECCEs.

<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB) or a master gNB (MgNB)) and a secondary base station device (a secondary eNB (SeNB) or a secondary gNB (SgNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG Further, in the SCG the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB (or MgNB) and the SeNB (or SgNB). A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (or MgNB) (PCell) and transmits the UCI corresponding to the cell in the SCG only through SeNB (or SgNB) (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs is not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of Downlink Resource Elements Mapping of NR in Present Embodiment>

Figure 10:
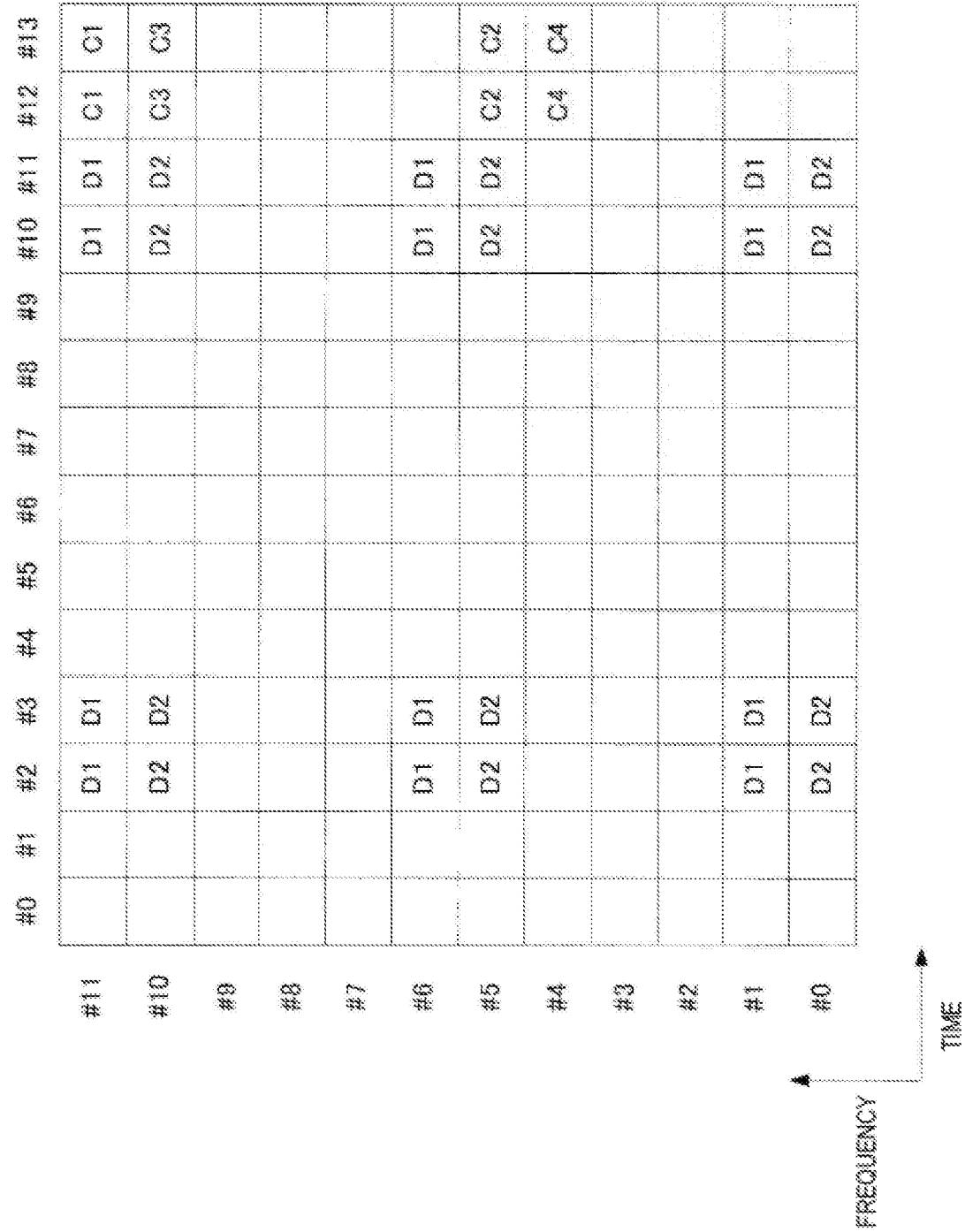
FIG. 10 is a diagram illustrating an example of downlink resource element mapping of NR according to the present embodiment.

FIG. 10 is a diagram illustrating an example of the downlink resource element mapping of NR according to the present embodiment. FIG. 10 illustrates a set of resource elements in the predetermined resources in a case in which parameter set 0 is used. The predetermined resources illustrated in FIG. 10 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 10, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 11:
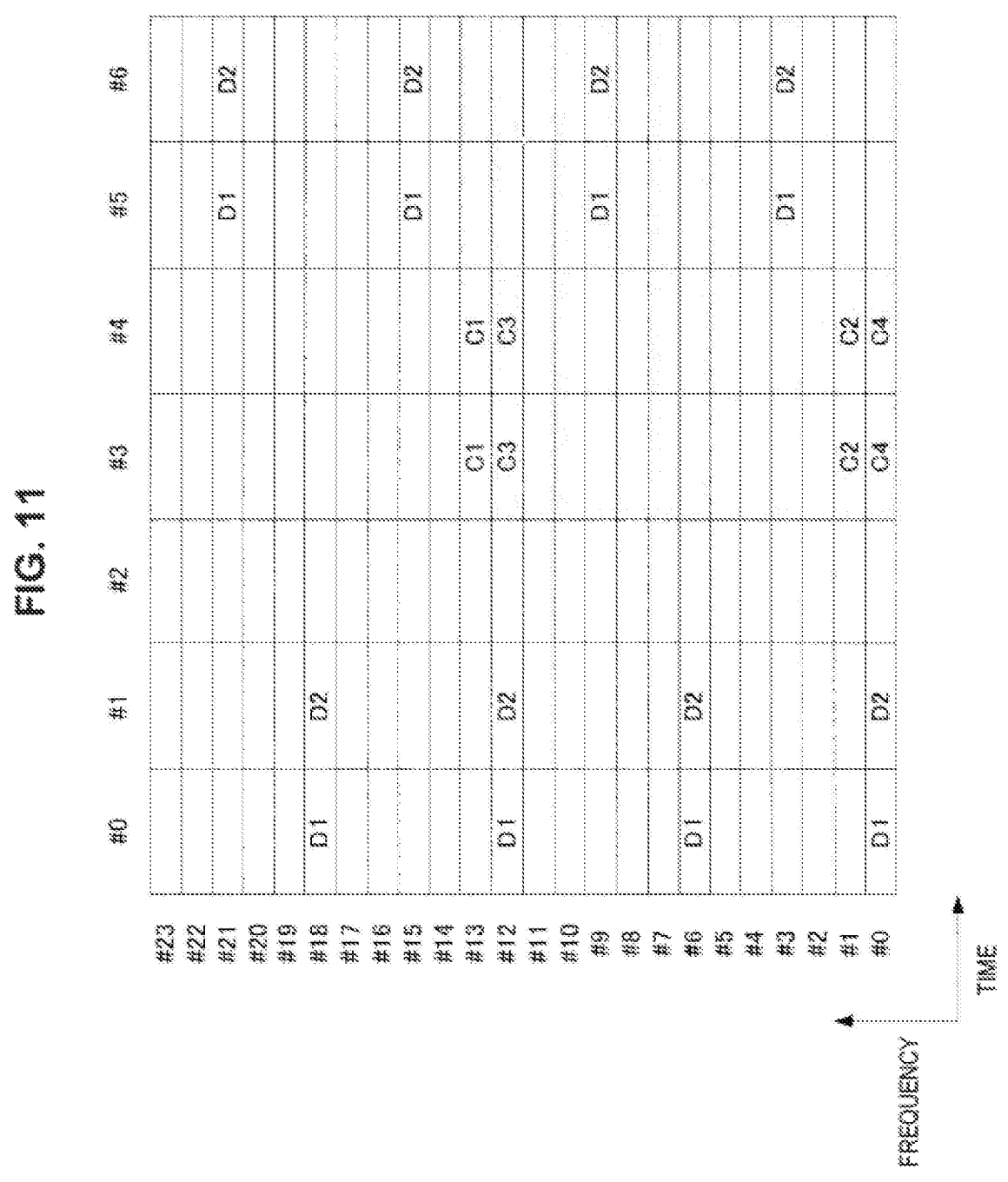

FIG. 11 is a diagram illustrating an example of the downlink resource element mapping of NR according to the present embodiment. FIG. 11 illustrates a set of resource elements in the predetermined resources in a case in which parameter set 1 is used. The predetermined resources illustrated in FIG. 11 are resources formed by the same time length and frequency bandwidth as one resource block pair in LTE.

In the example of FIG. 11, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
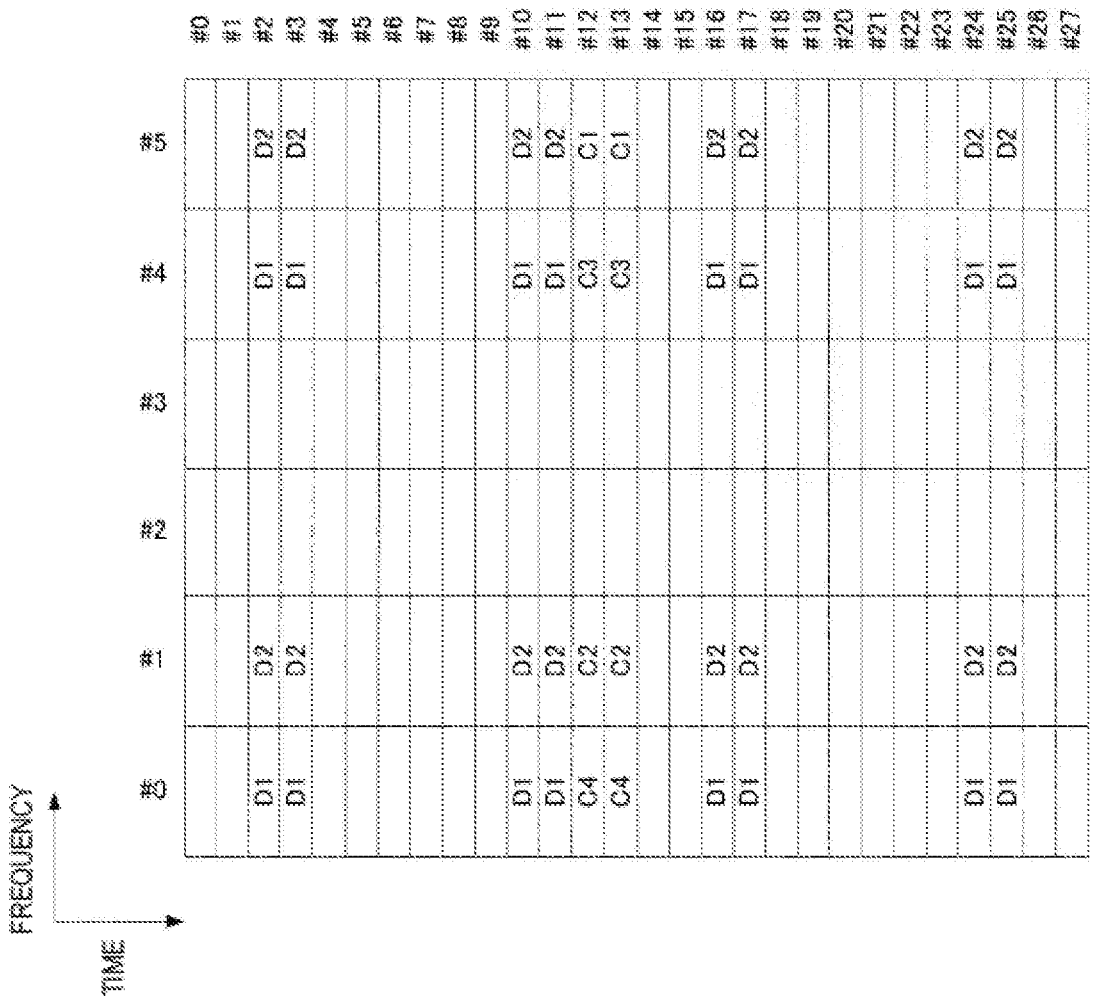
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Frame Configuration of NR in Present Embodiment>

Figure 13:
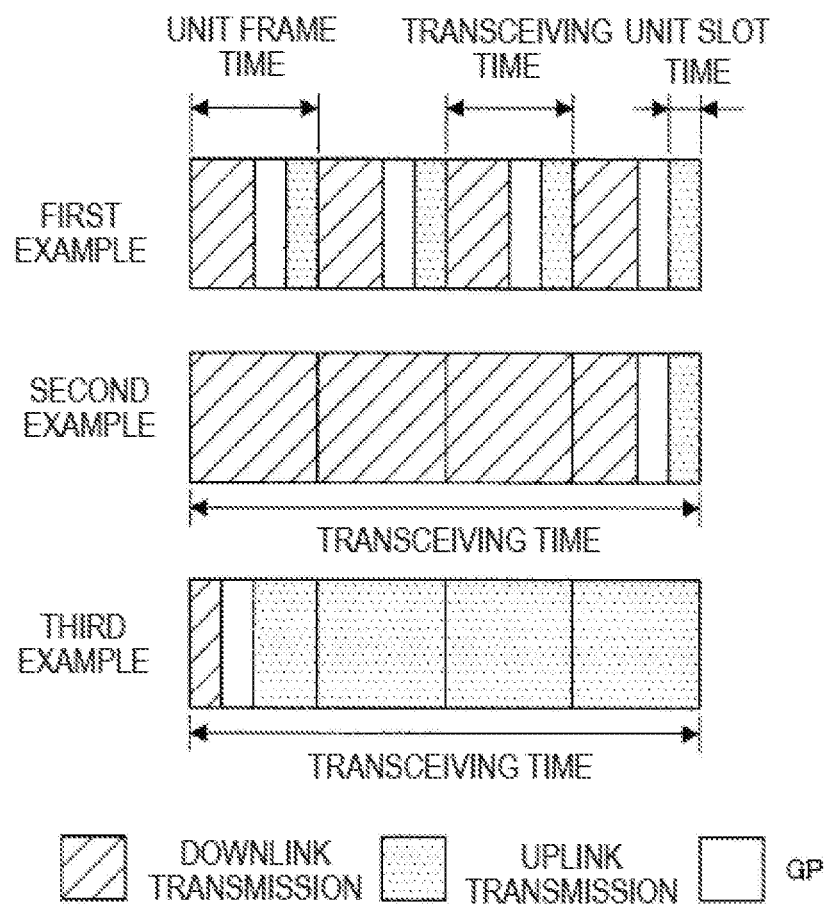
FIG. 13 is a diagram illustrating an example of a frame configuration of self-contained transmission according to the present embodiment.

In NR, a physical channel and/or a physical signal can be transmitted by self-contained transmission. FIG. 13 illustrates an example of a frame configuration of the self-contained transmission in the present embodiment. In the self-contained transmission, single transceiving includes successive downlink transmission, a GP, and successive downlink transmission from the head in that order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, downlink communication with low delay can be realized.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. A time (a gap) in which neither the physical channel nor the physical signal is transmitted may occupy between one transceiving and another transceiving. The terminal device 2 may not average the CSI measurement between different transceiving. The transceiving time may be referred to as TTI. One transceiving time is defined as, for example, an integer multiple of the sampling interval ($T_s$), the symbol length, the unit slot time, or the unit frame time of NR.

<Non-Orthogonal Multiple Access (NOMA)>

In orthogonal multiple access (OMA), for example, transmission and reception are performed using a frequency axis and a time axis orthogonal to each other. At this time, as illustrated in FIG. 6, a frame configuration of frequency and time resources at a sub carrier interval is decided and resources equal to or greater than the number of resource elements may not be used.

On the other hand, in NOMA, non-orthogonal axes, for example, an interleave pattern axis, a spreading pattern axis, a scrambling pattern axis, a codebook axis, and a power axis, are added in addition to a frequency axis and a time axis orthogonal to each other to decide a frame configuration.

Figure 14:
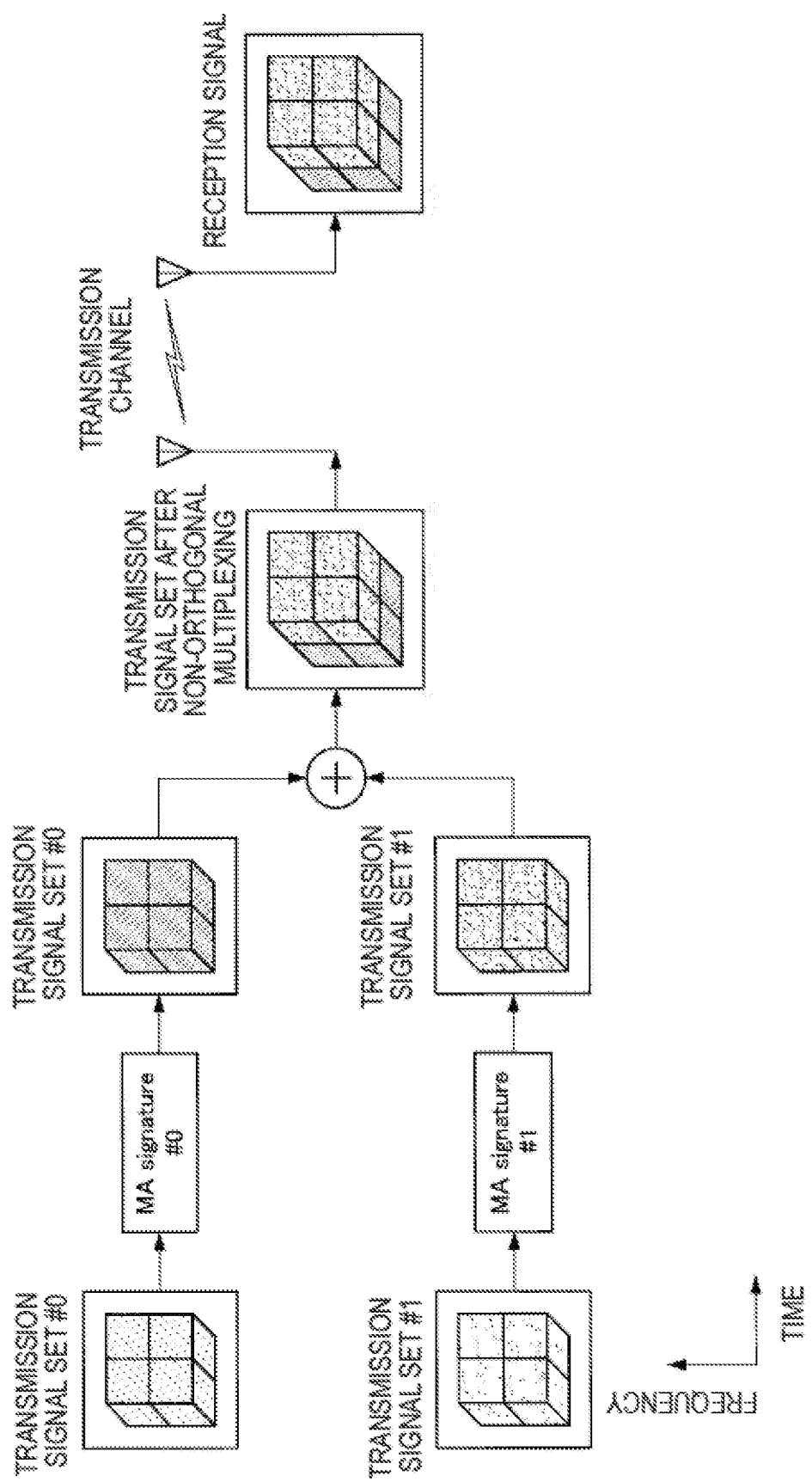
FIG. 14 is an explanatory diagram illustrating an example of a NOMA transmission process.
Figure 15:
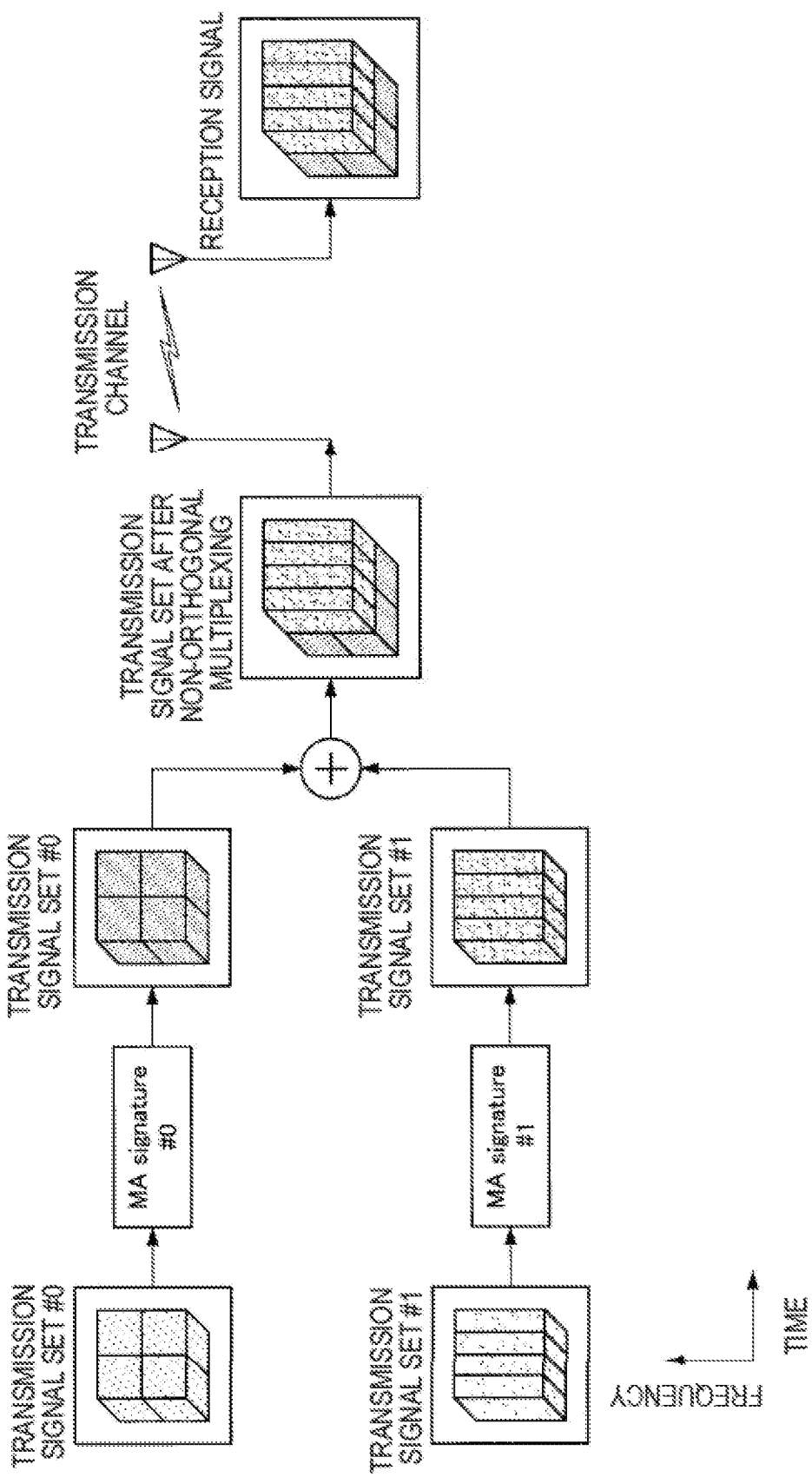
FIG. 15 is an explanatory diagram illustrating an example of a NOMA transmission process.

FIG. 14 is an explanatory diagram illustrating an example of a NOMA transmission process. For example, FIG. 14 illustrates a case of a parameter set in which transmission signals are multiplexed on non-orthogonal axes in a transmission device and all the resources multiplexed on the non-orthogonal axes are the same. Here, the transmission device is one of the base station device 1 and the terminal device 2. The transmission device prepares for a plurality of transmission signal sets to be multiplexed. In FIG. 14, two transmission signal sets are assumed to be multiplexed. Two transmission signal sets are used here, but three or more transmission signal sets may be used. In addition, each transmission signal set may be a transmission signal to a different reception device or may be a transmission signal to the same reception device. Here, the reception device is one of the base station device 1 and the terminal device 2. For each transmission signal set, corresponding Multiple Access (MA) signatures are applied. An MA signature is an example of information regarding non-orthogonal multiplexing. Here, examples of the MA signatures include an interleave pattern, a spreading pattern, a scrambling pattern, a codebook, power allocation, and the like. In addition, although the term "MA signature" is used here, the term may also be called a pattern or an index. Alternatively, an identifier such as a pattern or an index used in NOMA, as exemplified above, or a term indicating the pattern itself may be used. Signals after the MA signatures are applied are multiplexed on the same frequency and time resources and are sent to the same antenna port. In addition, a transmission signal set of the same parameter set is multiplexed in FIG. 14, but a transmission signal set of different parameter sets may be multiplexed, as illustrated in FIG. 15. FIG. 15 is the same as FIG. 14 except that the transmission signal set of the different parameter sets is multiplexed.

Figure 16:
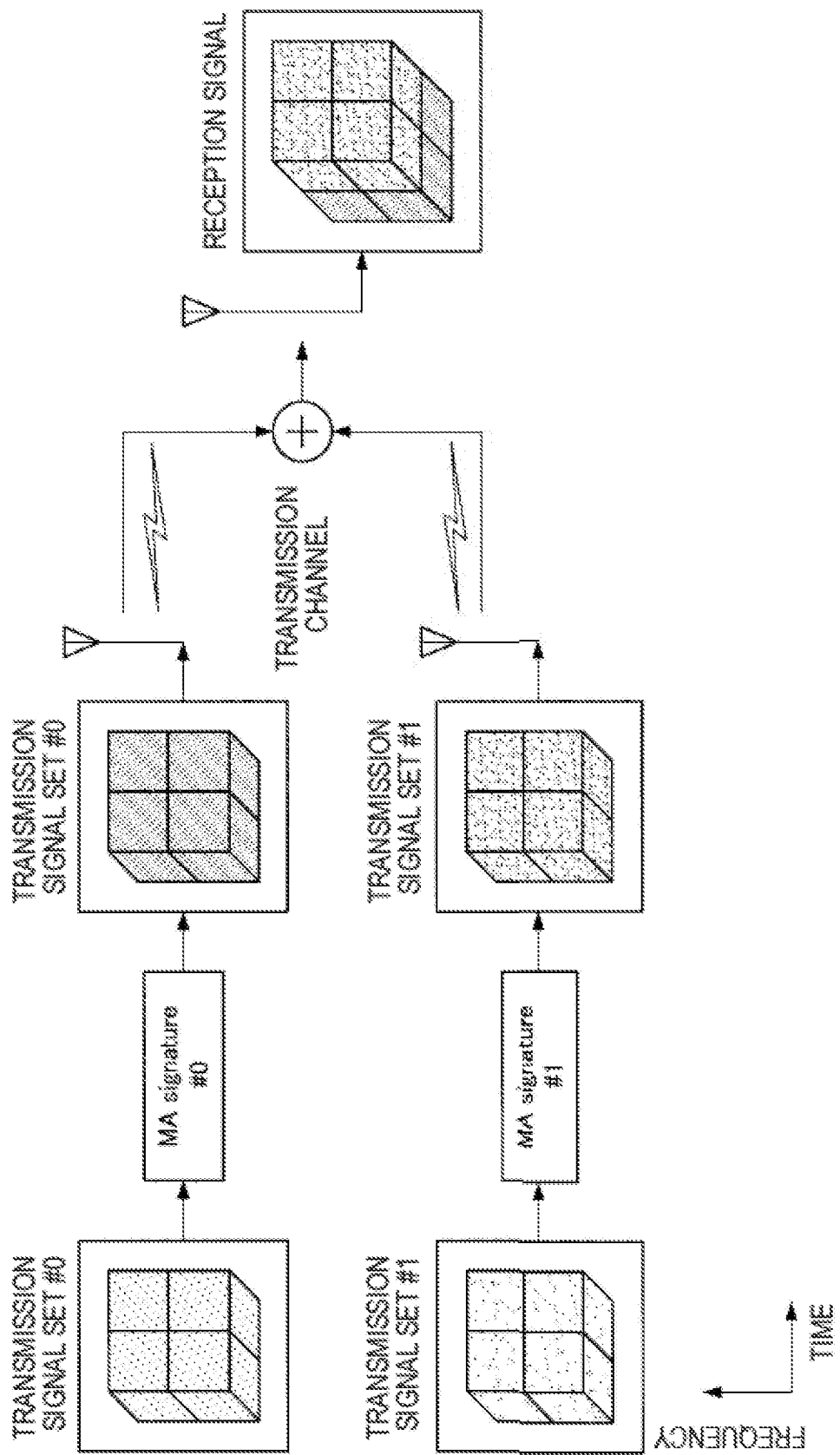
FIG. 16 is an explanatory diagram illustrating an example of a NOMA transmission process.
Figure 17:
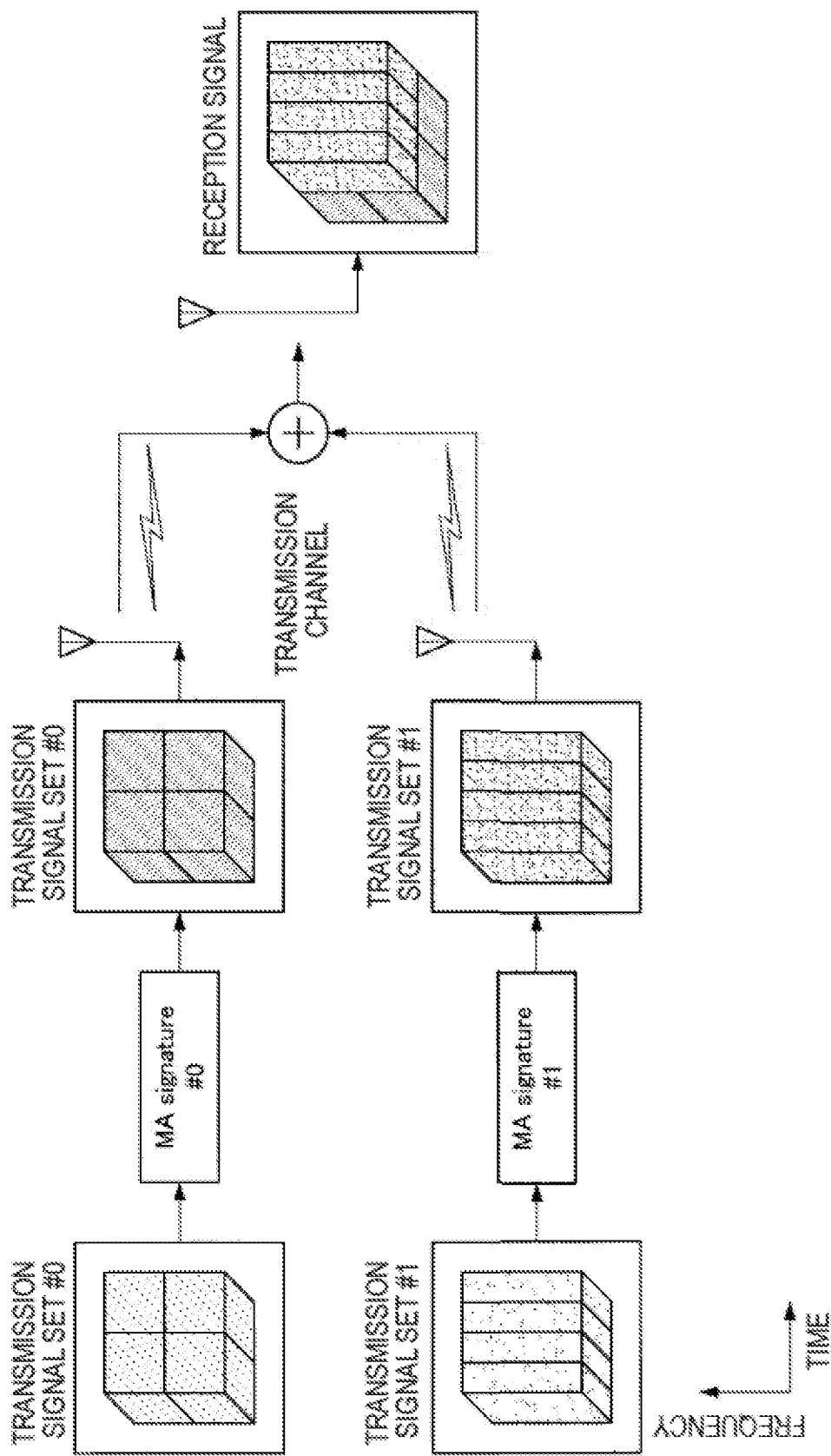
FIG. 17 is an explanatory diagram illustrating an example of a NOMA transmission process.

FIGS. 16 and 17 are explanatory diagrams illustrating an example of a NOMA transmission process. On the other hand, as illustrated in FIGS. 16 and 17, a transmission method of transmitting signals to which the MA signatures are applied without multiplexing in the transmission device so that the signals are subjected to the non-orthogonal multiplexing in the reception device can also be considered. For each transmission signal set, corresponding MA signatures are applied. Here, examples of the MA signatures include an interleave pattern, a spreading pattern, a scrambling pattern, a codebook, power allocation, and the like. The signals after the MA signatures are applied are transmitted on the same frequency and time resources and are multiplexed through a propagation channel. In this case, each transmission signal set may be transmitted from different transmission devices. In addition, as illustrated in FIG. 17, the parameter sets of the transmission signals transmitted on the same frequency and time resources may be different parameter sets.

Figure 18:
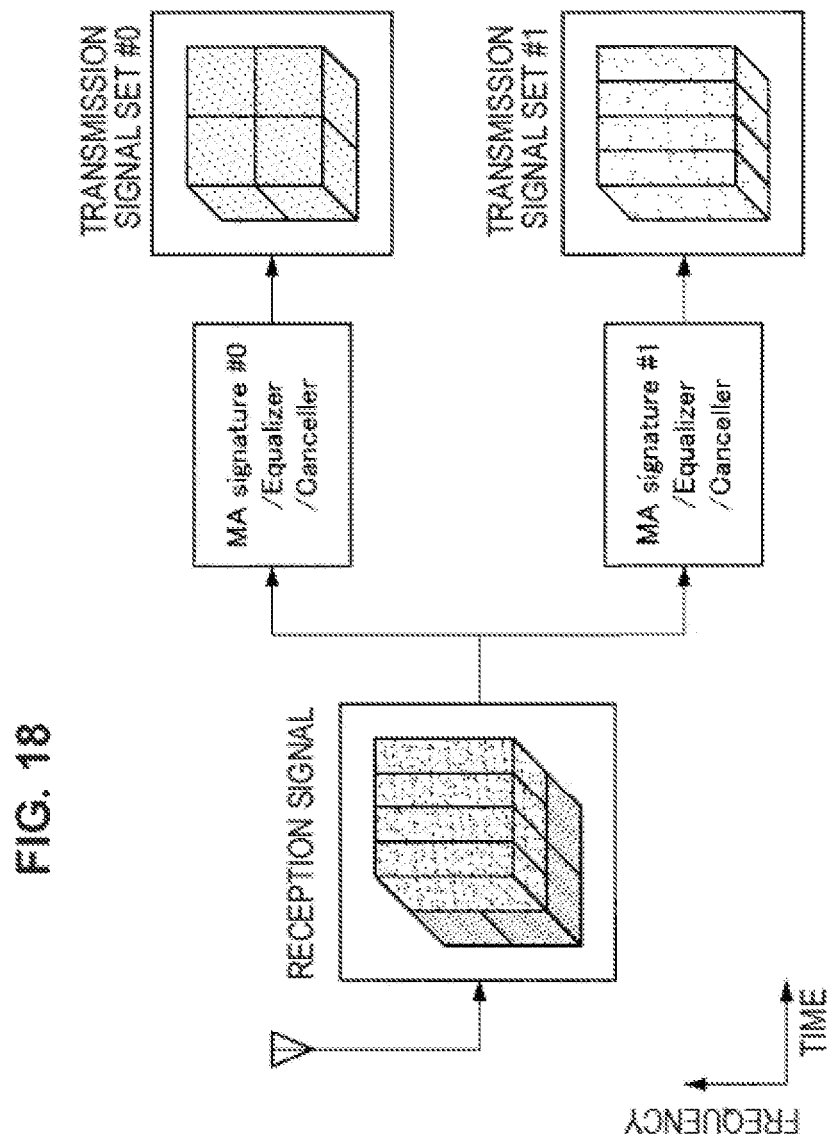
FIG. 18 is an explanatory diagram illustrating an example of a NOMA reception process.

FIG. 18 is an explanatory diagram illustrating a reception device performing a NOMA reception process. As illustrated in FIG. 18, reception signals are received in a state in which the plurality of transmission signals is multiplexed on the same frequency and time resources. In the reception device, the MA signatures applied in the transmitter are applied in order to decode the multiplexed transmission signal sets and desired signals are extracted by a channel equalization and interference signal canceller. At this time, in a case in which the signals are multiplexed using the same MA signatures, an influence of interference between the multiplexed signals may increase and it may be difficult to decode the signals.

In this way, in NOMA transmission, the MA signatures applied in the transmission device and the reception device need to be shared between the transmission device and the reception device, and the MA signatures need to be applied without overlapping. Further, in a case in which resources are referred to in the following description, an MA signature shall also be included as one of resources. Here, resources including all of frequency, time, and MA signatures may also be called multiple access (MA) resources.

<Grant-Free Based Transmission>

The grant-free based transmission represents that the terminal device 2 makes transmission utilizing resources delimited by an appropriate frequency axis and an appropriate time axis without the terminal device 2 receiving resource allocation (Grant) from the base station device 1. Main objects are reduction of power consumption and low-delay communication of the terminal device 2 achieved by reducing signaling overhead. In conventional grant based transmission, the base station device 1 notifies the terminal device 2 of resources to be used in downlink/uplink, so that communication can be made without occurrence of resource contention with another terminal device 2, whereas signaling overhead due to this notification occurs.

Figure 19:
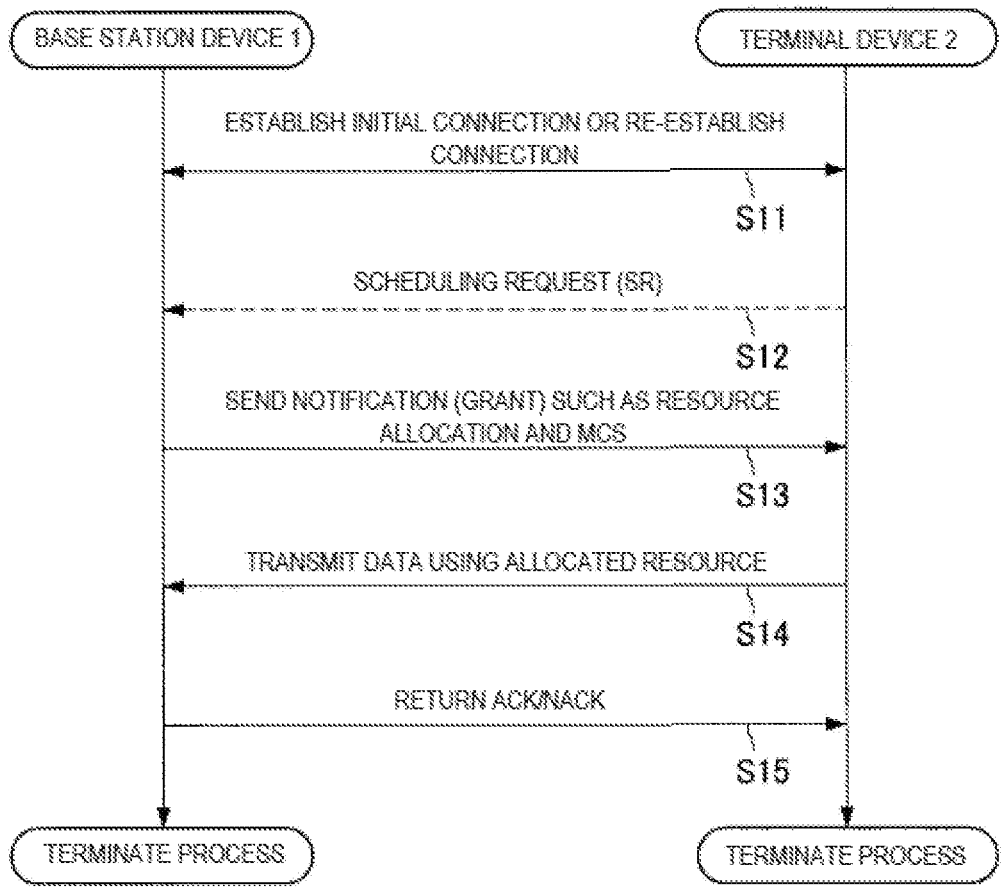
FIG. 19 is a flowchart illustrating an example of grant based transmission.

FIG. 19 is a flowchart illustrating an example of grant based transmission. For example, in a case of grant based transmission as illustrated in FIG. 19, when initial connection is established or connection is re-established between the base station device 1 and the terminal device 2 (step S11), the terminal device 2 transmits a scheduling request (SR) to the base station device 1 (step S12). The base station device 1 notifies (grants) the terminal device 2 of resource allocation, MCS, and the like (step 13). The terminal device 2 transmits data to the base station device 1 using allocated resources (step 14). The base station device 1 returns ACK or NACK to the terminal device 2 (step 15).

Since the terminal device 2 transmits data using the resource, MCS, and the like allocated by the base station device 1, signaling overhead resulting from step S13 (including signaling overhead resulting from step S12 in some cases) occurs. Such signaling overhead is reduced in grant-free based transmission.

Figure 20:
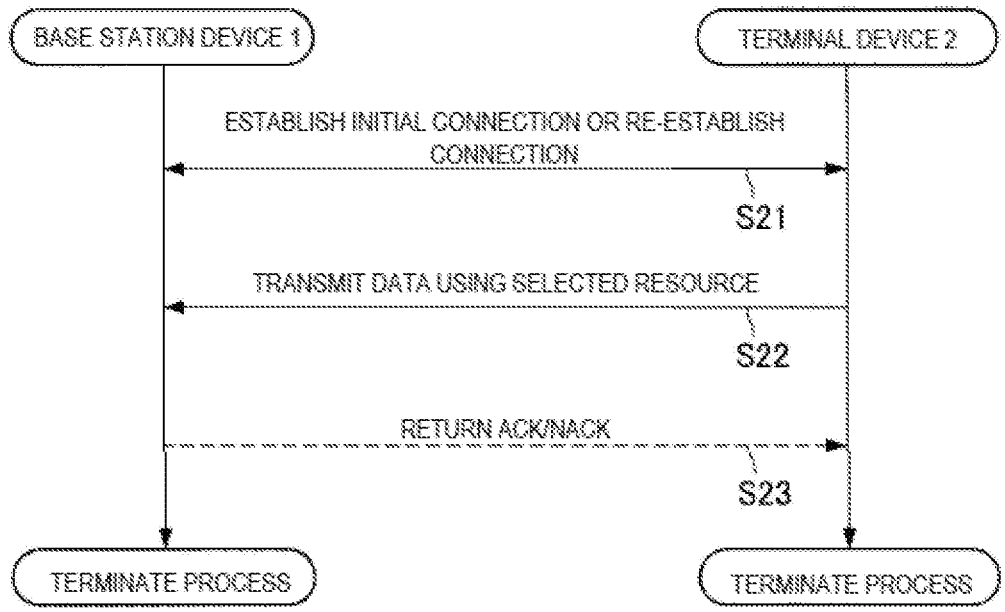
FIG. 20 is a flowchart illustrating an example of grant-free based transmission.

FIG. 20 is a flowchart illustrating an example of grant-free based transmission. For example, in a case of grant-free based transmission as illustrated in FIG. 20, when initial connection is established or connection is re-established between the base station device 1 and the terminal device 2 (step S21), the terminal device 2 transmits data to the base station device 1 using arbitrarily selected resources (step 22). The base station device 1 returns ACK or NACK to the terminal device 2 (step 23).

Since communication in which processing in steps S12 and S13 in FIG. 19 has been reduced is made in the case of grant-free based transmission as illustrated in FIG. 20, grant-free based transmission in which a resource allocation notification is not made is considered as a promising technological candidate for reduction of power consumption and low-delay communication required in next-generation communication. The terminal device 2 may select transmission resources in grant-free based transmission from the entire usable band, or from a prescribed resource pool. The resource pool may be decided statically as a specification, or may be designated when connection between the base station device 1 and the terminal device 2 is established, or may be set semi-statically or dynamically by system information, DCI, or the like.

At this time, since the processing in step S13 in FIG. 19 is reduced, the base station device 1 no longer notifies the terminal device 2 of a parameter to be required for transmission. Conventionally, the terminal device 2 appropriately sets the parameter related to transmission of which the base station device 1 has notified the terminal device 2, so that transmission efficiency can be improved. However, since the parameter notification is not performed in grant-free based transmission, degradation of transmission efficiency is a concern. This is a point to be taken into consideration in grant-free based transmission.

Accordingly, the discloser of the present case has devised a transmission parameter setting technology for grant-free based transmission as will be described below.

<Link Adaptation at the Time of Grant-Free Based Transmission>

The discloser of the present case has studied application of link adaptation as one of transmission parameter setting methods for grant-free based transmission. Here, link adaptation in the present embodiment shall be causing transmission from the terminal device 2 to be carried out appropriately by the base station device 1 semi-statically or dynamically notifying the terminal device 2 of a transmission parameter required in transmission performed by the terminal device 2. For example, also in a case in which the terminal device 2 performs grant-free based transmission, it is desirable to perform such a transmission parameter setting that transmission can be made more reliably. The following are considered as examples of the above-described "such a transmission parameter setting that transmission can be made more reliably".

(1) Transmission Under Appropriate Modulation and Coding Scheme (MCS)

By allocating an appropriate MCS for transmission from the terminal device 2, communication capacity and communication reliability in communication between the base station device 1 and the terminal device 2 are improved.

(2) Switching to Grant-Free Based Transmission or Grant Based Transmission with Resources Having High or Low Contention Ratio By selecting resources for each use case set in advance by the base station device 1 depending on a use case of the terminal device 2 (whether highly reliable communication is given priority, high-speed communication is given priority, or the like), the communication speed or communication reliability in communication between the base station device 1 and the terminal device 2 is improved.

(3) Appropriate Power Control Value Setting

By setting appropriate transmission power for the terminal device 2, it is possible to minimize the influence of interference to be exerted on the surroundings by the terminal device 2, and the throughput of the entire system is improved.

(4) Appropriate Timing Advanced Value Setting

By setting an appropriate timing advanced value for the terminal device 2, synchronization of reception of a signal transmitted from the terminal device 2 can be ensured, and a reception property in communication between the base station device 1 and the terminal device 2 is improved.

(5) Setting at Appropriate Transport Block Size (TBS) Size

By setting an appropriate transport block size for the terminal device 2, transmission in a redundant or too short TBS is reduced, and communication capacity and communication reliability in communication between the base station device 1 and the terminal device 2 are improved.

(6) Reset to Transmission Setting at the Time of Initial Connection

It is considered that resetting a transmission parameter of the terminal device 2 to a setting at the time of initial connection is effective in communication between the base station device 1 and the terminal device 2 because the transmission parameter can be returned to an initial value at a time in a case of a system of switching the transmission parameter stepwise.

It is desirable that the above methods (1) to (6) can be changed dynamically or semi-statically, whilst in a case in which signaling is reduced by carrying out grant-free based transmission, the base station device 1 may be incapable of semi-statically or dynamically notifying the terminal device 2 of the above-described transmission parameter as conventional. In that case, the above-described transmission parameter needs to be set statically. However, in a case in which these values statically set are inappropriate values for some terminal devices 2 because of a poor channel state or the like, for example, there is a concern that grant-free based transmission will be continued in a state in which communication does not succeed. On the other hand, in a case in which a value obtained by assuming a situation in which the channel state is worst is set statically, any terminal device 2 is more likely to succeed in communication, but some terminal devices 2 essentially capable of making communication with a larger capacity will have to make low-capacity communication in conformity with other terminal devices 2, which is not desirable from the viewpoint of frequency utilization efficiency. Also from these viewpoints, it is desirable that, in grant-free based communication, there is a mechanism such as link adaptation in which these transmission parameters are set dynamically or semi-statically for the purpose of making more highly efficient and more highly reliable communication. As indicated above, in conventional grant based transmission, the base station device 1 notifies the terminal device 2 of the above-described information and the like by transmitting DCI to the terminal device 2 to achieve dynamic link adaptation. On the other hand, in the case of grant-free based transmission, since it is considered that notification of these types of information is also not performed because of reduction of DCI notification, it is necessary to statically define a value in advance, or study another semi-static or dynamic setting method instead of conventional DCI. Hereinafter, a link adaptation technique in grant-free based transmission will be described.

<Link Adaptation Example at the Time of Grant-Free Based Transmission>

An example of link adaptation at the time of grant-free based transmission will be described. An information set necessary for link adaptation shall be called "an information set related to link adaptation" below. Examples of information included in an information set related to link adaptation include MCS, power control, timing advance value, resource allocation (including MA signatures), transport block size, CP length, and the like. Further, information included in an information set related to link adaptation may be a plurality of pieces of the information described above, or may be any one of them.

As an example of a method of carrying out link adaptation at the time of grant-free based transmission, the base station device 1 notifies the terminal device 2 of an information set related to link adaptation and a determination condition to be required to switch the information set related to link adaptation. The terminal device 2 uses the notified information set related to link adaptation and the determination condition, and the terminal device 2 changes the transmission parameter semi-statically or dynamically to carry out transmission.

Figure 21:
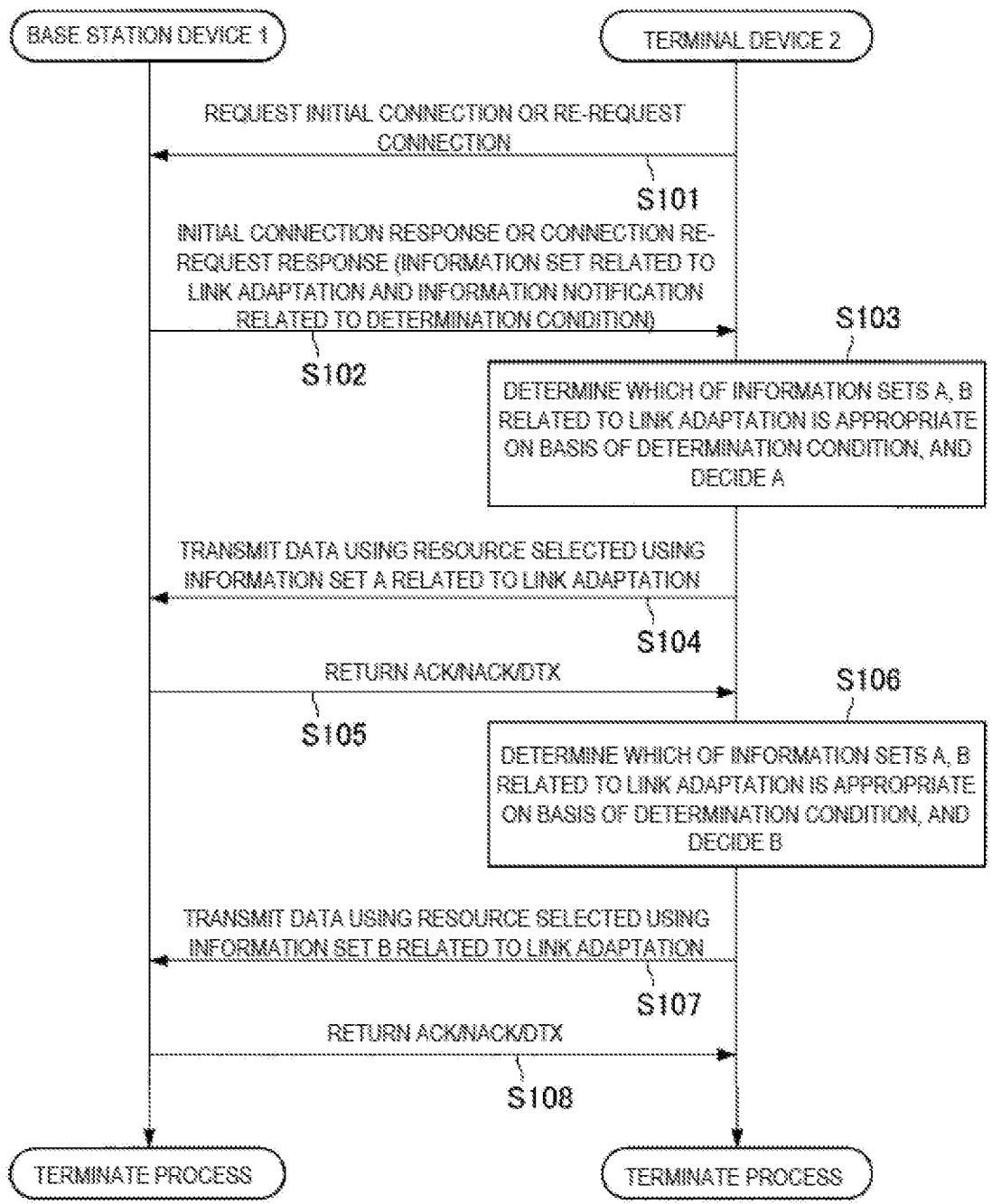
FIG. 21 is a flowchart illustrating a method of carrying out link adaptation at the time of grant-free based transmission according to the present embodiment.

FIG. 21 is a flowchart illustrating a method of carrying out link adaptation at the time of grant-free based transmission according to the present embodiment. The terminal device 2 requests initial connection or requests connection re-establishment from the base station device 1 (step S101). At the time of connection response to the terminal device 2, the base station device 1 receives information sets related to link adaptation and an information notification related to the determination condition (step S102). The terminal device 2 determines which information set among the information sets related to link adaptation is appropriate on the basis of the determination condition of which the base station device 1 has notified (step S103). In the example of FIG. 21, a case in which the base station device 1 notifies the terminal device 2 of two information sets A, B related to link adaptation is illustrated. Further, in the example illustrated in FIG. 21, the terminal device 2 determines that the information set A related to link adaptation is appropriate in the determination in this step S103, and carries out grant-free based transmission using the information set A related to link adaptation (step S104). The base station device 1 returns ACK, NACK, or DTX to the terminal device 2 in response to data transmission from the terminal device 2 (step S105).

The terminal device 2 similarly determines which of information sets related to link adaptation is appropriate also before the second grant-free based transmission on the basis of the notified determination condition (step S106), performs grant-free based transmission (step S107). In the example of FIG. 21, the terminal device 2 determines that the information set B related to link adaptation is appropriate in the determination in step S106, and carries out grant-free based transmission using the information set B related to link adaptation. The base station device 1 returns ACK, NACK, or DTX to the terminal device 2 in response to data transmission from the terminal device 2 (step S108).

The determination of the information set related to link adaptation in steps S103 and S106 may always be carried out before the terminal device 2 makes each transmission, or may be carried out once in several times, for example, or may be carried out on the basis of an instruction from the base station device 1. In the case of carrying out the determination once in several times, it may be fixed at X times statically, or may be the number of times instructed from the base station device 1. In the case based on an instruction from the base station device 1, the base station device 1 may instruct the number of times or a timing to carry out at the time of initial connection response in step S102, or notification may be performed together at a timing of returning ACK, NACK, or DTX in step S105, S108, or the like, for example. Further, ACK, NACK, or DTX herein may be regarded as being used in LTE (HARQ: Hybrid ARQ).

As the determination condition for the base station device 1 to notify the terminal device 2, examples indicated below are considered. Further, examples of the determination carried out in steps S103 and S106 in the terminal device 2 will also be indicated below. Herein, the following examples will be given mainly using the two information sets A, B related to link adaptation as examples, whilst three or more information sets may be used as a matter of course.

(1) Linkage to Sub Frame Number

For example, in a case of a sub frame number A, the terminal device 2 selects the information set A related to link adaptation, and in a case of a sub frame number B, selects the information set B related to link adaptation. That is, an information set related to link adaptation is linked to a sub frame number to achieve link adaptation. For example, the terminal device 2 selects the information set A related to link adaptation having low reliability but larger capacity at the sub frame number A, and selects the information set B related to link adaptation having small capacity but high reliability at the sub frame number B. For example, it is considered that, in a case of wishing to carry out transmission with higher reliability, the terminal device 2 makes transmission at the sub frame number B using the information set B related to link adaptation, or the like.

(2) Linkage to Slot (or Mini Slot)

For example, in a case of a slot (or mini slot) A, the terminal device 2 selects the information set A related to link adaptation, and in a case of a slot (or mini slot) B, selects the information set B related to link adaptation. That is, an information set related to link adaptation is linked to a slot (or mini slot) to achieve link adaptation. For example, the terminal device 2 selects the information set A related to link adaptation having low reliability but larger capacity at the slot (or mini slot) A, and selects the information set B related to link adaptation having small capacity but high reliability at the slot (or mini slot) B. For example, it is considered that, in a case of wishing to carry out transmission with higher reliability, the terminal device 2 makes transmission at the slot (or mini slot) B using the information set B related to link adaptation, or the like.

(3) Linkage to Channel State

For example, in a case in which a channel state is more than or equal to a predetermined threshold value Threshold, the terminal device 2 selects the information set A related to link adaptation, and in a case in which the channel state is less than the predetermined threshold value Threshold, selects the information set B related to link adaptation. That is, the terminal device 2 measures the channel state to achieve link adaptation. For example, it is considered that, in a case in which the channel state falls below the set threshold value Threshold, the terminal device 2 changes the information set related to link adaptation to the parameter set B having higher reliability, or the like. Here, the channel state may include not only instantaneous channel variations such as fading, but also short-section and long-section channel variations such as shadowing and path loss. For example, in a case of linkage to path loss, the terminal device 2 may measure the distance from the base station device 1 on the basis of positional information or the like to determine the channel state.

(4) Linkage to Repetition Number or Retransmission Number

For example, the terminal device 2 selects the information set A related to link adaptation at the time of initial transmission, and selects the information set B related to link adaptation at the time of transmission in which repetition is the first time. That is, it is considered to link the repetition number or retransmission number and a parameter of an information set related to link adaptation. Here, repetition is one of means for avoiding resource conflicts, and is a technique for increasing the probability of success of grant-free based transmission by transmitting data repeatedly. Further, retransmission represents HARQ used in LTE, for example. For example, it is considered that, at the time of the initial transmission, the terminal device 2 makes transmission using the information set A related to link adaptation having low reliability but larger capacity, and at the time of the second transmission, makes transmission using the information set B related to link adaptation having smaller capacity but higher reliability than in the initial transmission.

On the other hand, a case is considered in which the second and subsequent transmissions are not performed. Using HARQ as an example, in a case in which ACK is transmitted from the base station device 1 to the terminal device 2, for example, a case is considered in which the second and subsequent transmissions from the terminal device 2 to the base station device 1 are not performed, but next data is transmitted. As an information set related to link adaptation used in the transmission of this next data, an information set related to link adaptation used in the previous transmission may be applied as it is, or may be reset to an information set related to link adaptation at the time of the initial setting.

(5) Linkage to Distance Between Base Station Device 1 and Terminal Device 2

For example, in a case in which the distance between the base station device 1 and the terminal device 2 is less than the predetermined threshold value Threshold, the terminal device 2 selects the information set related to link adaptation, and in a case in which the distance between the base station device 1 and the terminal device 2 is more than or equal to the predetermined threshold value Threshold, selects the information set B related to link adaptation. That is, the terminal device 2 measures the distance between the base station device 1 and the terminal device 2, for example, to achieve link adaptation. As described for the above channel state, since path loss increases as the distance between the base station device 1 and the terminal device 2 increases, the channel state in a long section becomes a poor state. Further, as the distance between the base station device 1 and the terminal device 2 increases, it is necessary for the terminal device 2 to transmit a signal with higher transmission power. Accordingly, it is considered that, in a case in which the distance between the base station device 1 and the terminal device 2 is more than or equal to the set threshold value Threshold, for example, the terminal device 2 changes the information set related to link adaptation to the parameter set B having higher reliability, or the like. As a parameter set having high reliability, a parameter for setting transmission power to be higher than usual, for example, may be included. In the present embodiment, when the terminal device 2 measures the distance from the base station device 1, the terminal device 2 may measure the distance each time the terminal device 2 makes transmission, or may measure the distance at regular transmission time intervals, or may measure the distance at a timing when NACK is received from the base station device 1, for example.

(6) Linkage to TA Offset

For example, in a case in which a TA offset is less than the predetermined threshold value Threshold, the terminal device 2 selects the information set A related to link adaptation, and in a case in which the TA offset is more than or equal to the predetermined threshold value Threshold, selects the information set B related to link adaptation. That is, it is considered to link the TA offset and a parameter of an information set related to link adaptation, for example. With an increase of the TA offset, it is assumed that the distance between the base station device 1 and the terminal device 2 is longer, that is, it is assumed that path loss has become larger. Further, as the distance between the base station device 1 and the terminal device 2 becomes longer, it is necessary for the terminal device 2 to transmit a signal with higher transmission power. Accordingly, it is considered that, in a case in which the TA offset is more than or equal to the set threshold value Threshold, for example, the terminal device 2 changes the information set related to link adaptation to the parameter set B having higher reliability, or the like.

(7) Linkage to Cyclic Prefix (CP) Length

For example, in a case in which the CP length is A, the terminal device 2 selects the information set A related to link adaptation, and in a case in which the CP length is B, selects the information set B related to link adaptation. That is, it is considered to link the CP length and a parameter of an information set related to link adaptation, for example. In a case in which a long CP is used, there is a tendency that it is used in an environment in which the distance between the base station device 1 and the terminal device 2 is long in many cases. That is, it is assumed that the path loss has been increased. Further, the distance between the base station device 1 and the terminal device 2 becomes longer, it is necessary for the terminal device 2 to transmit a signal with higher transmission power. Accordingly, it is considered that, in the case in which the CP length is A, for example, the terminal device 2 makes a change to the information set A related to link adaptation, and in the case in which the CP length is B, makes a change to the information set B related to link adaptation, or the like.

Further, in a case in which the CP length is less than the predetermined threshold value Threshold, for example, the terminal device 2 selects the information set A related to link adaptation, and in a case in which the CP length is more than or equal to the predetermined threshold value Threshold, selects the information set B related to link adaptation. That is, the CP length may be linked with the predetermined threshold value Threshold, for example. For example, it is considered that, in the case in which the CP length is less than the threshold value Threshold, the terminal device 2 makes a change to the information set A related to link adaptation, and in the case in which the CP length is more than or equal to the threshold value Threshold, makes a change to the information set B related to link adaptation, or the like. In other words, these (5) to (7) can also be referred to as cases of selecting an information set related to link adaptation on the basis of information related to transmission power.

(8) Linkage to Parameter Set

For example, in a case in which a parameter set is A, the terminal device 2 selects the information set A related to link adaptation, and in a case in which the parameter set is B, selects the information set B related to link adaptation. That is, an information set related to link adaptation is linked to a parameter set, for example, to achieve link adaptation. It is considered that, in a case in which the parameter set A is set, the terminal device 2 selects the information set A related to link adaptation, and in a case in which the parameter set B is set, selects the information set B related to link adaptation, or the like.

(9) Linkage to Antenna Port

For example, in a case in which an antenna port at the time of transmission is A, the terminal device 2 selects the information set A related to link adaptation, and in a case in which the antenna port is B, selects the information set B related to link adaptation. That is, an information set related to link adaptation is linked to an antenna port, for example, to achieve link adaptation. It is considered that, in the case in which the antenna port A is used, the terminal device 2 selects the information set A related to link adaptation, and in the case in which the antenna port B is used, selects the information set B related to link adaptation, or the like. In a case of applying a different information set related to link adaptation for each antenna port, it is desirable that the channel state of each antenna port is known. It is considered that, in a case in which the channel state of an antenna port is poor (in a case in which the channel state is lower than the predetermined threshold value Threshold), for example, an information set related to link adaptation having higher reliability is used, and on the other hand, in a case in which the channel state is good (in a case in which the channel state is more than or equal to the predetermined threshold value Threshold), an information set related to link adaptation having large capacity is used.

(10) Linkage to Channel Congestion Degree Information

For example, in a case in which the channel congestion degree is less than the predetermined threshold value Threshold, the terminal device 2 selects the information set A related to link adaptation, and in a case in which the channel congestion degree is more than or equal to the predetermined threshold value Threshold, selects the information set B related to link adaptation. That is, for example, it is considered to link channel congestion degree information and a parameter of an information set related to link adaptation. With an increase of the channel congestion degree, it is assumed that a resource selected by the terminal device 2 is highly likely to conflict with a resource selected by another terminal device 2. Accordingly, in a case in which the channel congestion degree exceeds the set threshold value Threshold, for example, it is considered to change the information set related to link adaptation to the parameter set B having higher reliability, or the like. The base station device 1 may notify the terminal device 2 of the channel congestion degree information as an index. For example, the channel congestion degree may be linked to an index as shown in Table 1, and the base station device 1 may notify the terminal device 2 of that index. The notification may be performed by, for example, system information, RRC signaling, DCI, or the like. The terminal device 2 decides an information set related to link adaptation using this information.

[Table 1]

TABLE 1

(Example of relationship between channel congestion degree and index)

| Index Number | Channel Congestion Degree |
| --- | --- |
| Index 0 | 0-25% |
| Index 1 | 25-50% |
| Index 2 | 50-75% |
| Index 3 | 75-100% |

Furthermore, as one of measures against frequency axis and time axis resource contention at the time of grant-free based transmission, it is considered to apply a NOMA technology. By applying the NOMA technology to the grant-free based transmission, it is possible to further add non-orthogonal axes to the frequency axis and time axis to separate a signal by the non-orthogonal axes even in a case in which contention occurs in frequency axis and time axis resources. In NOMA, a signal is separated using MA signatures as described above, and here, it is considered to link MA signatures and an information set related to link adaptation to achieve link adaptation.

(11) Linkage to MA Signatures

In a case in which an MA signature is A, the terminal device 2 selects the information set A related to link adaptation, and in a case in which an MA signature is B, selects the information set B related to link adaptation. That is, an information set related to link adaptation is linked to an MA signature, for example, to achieve link adaptation. The MA signature A shall be the information set A related to link adaptation having low reliability but larger capacity, and the MA signature B shall be the information set B related to link adaptation having small capacity but high reliability. It is considered that, in a case of wishing to carry out transmission more reliably, the terminal device 2 makes transmission with the MA signature B using the information set B related to link adaptation, or the like. Further, depending on an MA signature, the reliability for each MA signature is different in some cases. For example, the MA signature B is a case in which the reliability is higher than that of the MA signature A. In that case, by linking a more reliable information set related to link adaptation to the MA signature B, more highly reliable communication is made possible. As a matter of course, a highly reliable information set related to link adaptation may be linked to the MA signature A having relatively low reliability in the above-described example.

Further, the base station device 1 may notify the terminal device 2 of an information set related to link adaptation in the format such as the set A or B, or the like, or the base station device 1 may notify the terminal device 2 of an individual increment value per parameter included in each set. Notification of the individual increment value per parameter included in each set is desirably performed at a timing of initial connection response (step S102) in FIG. 21, or the like, for example. In a case in which the terminal device 2 determines that a timing of switching a parameter of information related to link adaptation has arrived on the basis of a certain determination condition, for example, the terminal device 2 may increase/decrease a single parameter of information related to link adaptation by a predetermined value a, or the like. Examples include an example in which, in a case in which MCS 10 falls below the threshold value Threshold under a certain determination condition while grant-free based transmission has been performed at first using MCS 10, MCS 10 is changed to MCS 10+a, and the terminal device 2 makes grant-free based transmission, or the like. The base station device 1 may notify the terminal device 2 of the individual value a per parameter, or an index increment value a of an information set related to link adaptation. Further, this notification is not necessarily required.

Figure 22:
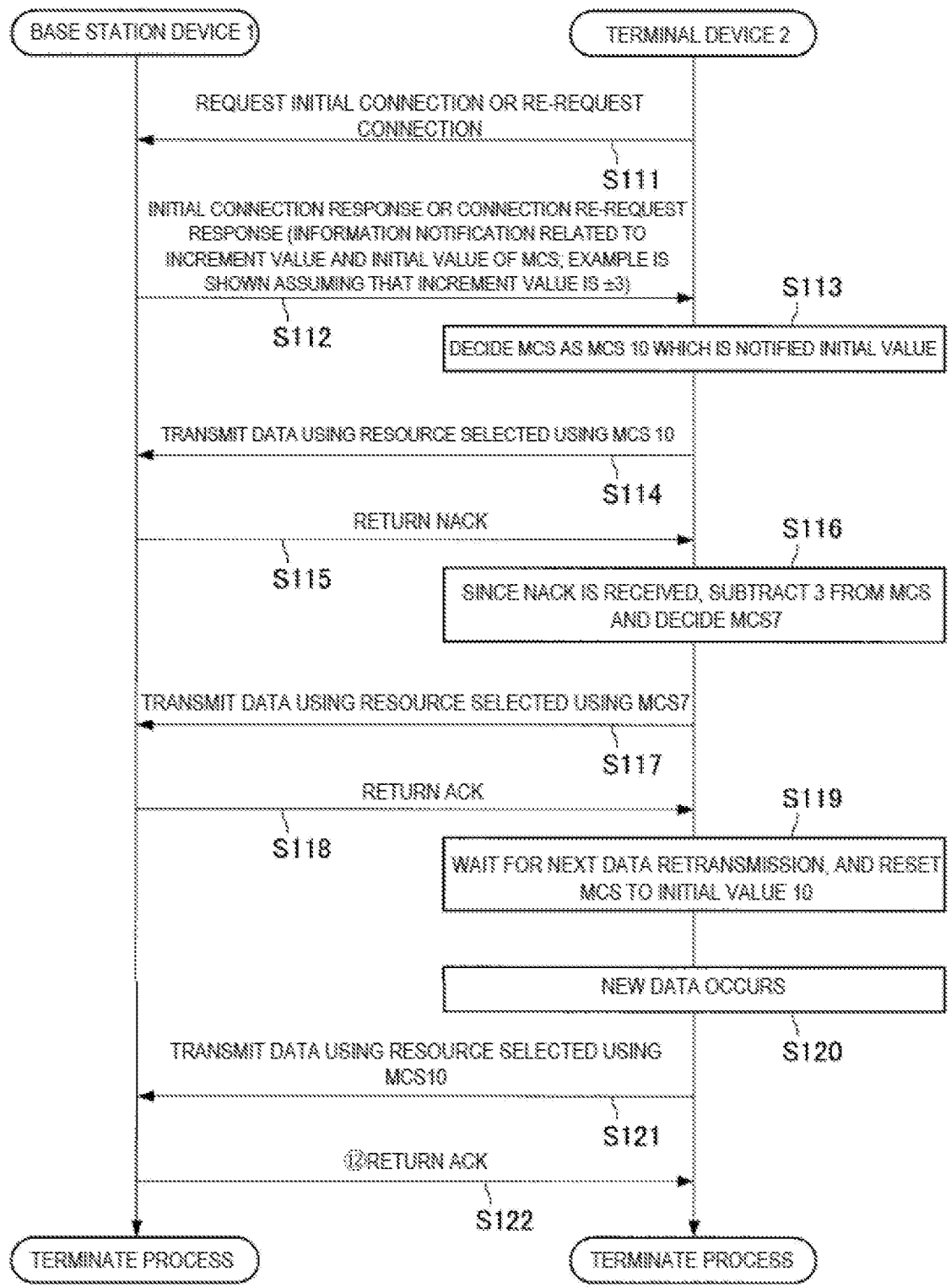
FIG. 22 is a flowchart illustrating an operation example of a base station device 1 and a terminal device 2 according to an embodiment of the present disclosure.

Here, an example of a case of switching an information parameter related to link adaptation using an increment value will be illustrated. FIG. 22 is a flowchart illustrating an operation example of the base station device 1 and the terminal device 2 according to an embodiment of the present disclosure. FIG. 22 is an example when increasing/decreasing MCS, whilst a sequential operation may be applied to another parameter other than MCS, as a matter of course.

When the terminal device 2 transmits an initial connection request to the base station device 1 (step S111), the base station device 1 notifies the terminal device 2 of an initial connection response, information related to an increment value for MCS, and an initial value of MCS (step S112). In the example of FIG. 21, it is assumed that the base station device 1 has notified the terminal device 2 of an MCS increment value of ±3. Here, the base station device 1 may notify the terminal device 2 of a determination condition for switching an information parameter related to link adaptation, instead of the initial value of MCS.

Thereafter, the terminal device 2 decides MCS on the basis of the notified initial value (step S113). Here, the terminal device 2 decides the initial value of MCS as MCS 10. The terminal device 2 transmits data to the base station device 1 with resources selected using MCS 10 (step S114). Here, it is assumed that the base station device 1 senses the data from the terminal device 2 to attempt to decode the data, but fails in decoding and returns NACK (step S115). In a case in which the base station device 1 fails in data sensing, the base station device 1 may return DTX. The terminal device 2 having received NACK or DTX subtracts 3 from MCS using the MCS increment value notified in step S112 in order to make a change to more highly reliable MCS (step S116), and performs data retransmission using MCS 7 (step S117). Since the base station device 1 senses data from the terminal device 2, and succeeds in decoding, the base station device 1 returns ACK (step S118). The terminal device 2 having received ACK waits for next data transmission. For example, the set value of MCS may be reset to MCS of the initial value at this timing (step S119). In the example of FIG. 22, it is assumed that the terminal device 2 resets to MCS 10 which is the initial value. Thereafter, when new data occurs (step S120), the terminal device 2 transmits the new data using MCS 10 which is the reset MCS (step S121). Since the base station device 1 senses data, and succeeds in decoding, the base station device 1 returns ACK to the terminal device 2 (step S122).

In the above-described example, the terminal device 2 having received NACK or DTX changes MCS, and when the next data transmission occurs, resets MCS to the initial value, whilst the present disclosure is not limited to such an example. For example, upon receipt of ACK from the base station device 1, the terminal device 2 may use the same parameter until NACK or DTX is received next time, and further, may reset the parameter to the initial value at a timing when a predetermined time has elapsed. The above processing is an example of a case of performing link adaptation by the grant-free based transmission, whilst another operation as will be described below may be performed.

The base station device 1 may notify of candidate sets of an information set related to link adaptation, an increment value of an information parameter related to link adaptation, an initial value, or a determination condition in a UE specific or resource pool specific manner. The base station device 1 may perform notification by DCI (common/UE specific) that does not include RRC signaling, system information block, resource allocation information, or the like. The base station device 1 may notify of DCI that does not include resource allocation information in a broadcasting manner, or may notify a terminal device individually. Further, the contents of candidate sets may include only one information set related to link adaptation.

Further, the terminal device 2 may make an arbitrary selection from among candidate sets of information related to link adaptation. Priority may be determined in advance among candidate sets of information related to link adaptation (in a case in which there are information sets A and C, the information set A is given higher priority, or the like). The base station device 1 may notify the terminal device 2 of this priority. Further, the terminal device 2 may notify the base station device 1 of the selected information set related to link adaptation. On this occasion, the terminal device 2 may notify the base station device 1 of information about the selected information set related to link adaptation by uplink control information. The terminal device 2 statically or semi-statically decides the information set related to link adaptation at the time of notification. Then, the notification timing may be the timing of step S104 or S107 in FIG. 21, for example, or the like. Further, on this occasion, the terminal device 2 may notify of information about the selected information set related to link adaptation by the uplink shared channel. The terminal device 2 statically or semi-statically decides the information set related to link adaptation at the time of notification. Then, the notification timing may be after the timing of step S104 or S107 in FIG. 21, for example. Then, the base station device 1 may perform decoding with the information set related to link adaptation notified by the terminal device 2.

Further, at the time of decoding, the base station device 1 may perform blind decoding using all the notified candidate sets of an information set related to link adaptation. By performing blind decoding, it is not necessary for the base station device 1 to receive which information set related to link adaptation the terminal device 2 has used. On this occasion, the base station device 1 repeats decoding until a match occurs by the CRC check, and in a case in which a match does not occur by the CRC check even using all the candidate sets, returns NACK or DTX to the terminal device 2.

In a case in which the terminal device 2 communicates with a relay node, an information set related to link adaptation, an increment value of an information parameter related to link adaptation, an initial value, or a determination criteria may be changed for communication with the relay node. Since it is considered that, in a case in which the terminal device 2 makes communication via a relay node, the channel state is different from that of a case of directly communicating with the base station device 1, a case in which it is preferable to change the information set related to link adaptation, parameter, or the like for communication with the relay node is considered. The terminal device 2 sets an offset by a predetermined index b from a setting of an information set related to link adaptation in a case in which there is no relay node. Here, b may take a negative value. That is, in a case in which there is no relay node, the terminal device 2 selects the information set A related to link adaptation, and in a case in which there is a relay node, selects the information set A+b (or A-b) related to link adaptation. The base station device 1 notifies the terminal device 2 of candidate sets of an information set related to link adaptation and a determination criteria in the case in which there is a relay node. The base station device 1 may use the same notification method and the like as those described above. Note that the terminal device 2 may not switch the information set related to link adaptation for relay node communication even in communication via the relay node. Further, instead of the base station device 1, a terminal device 2 serving as a master may notify another terminal device 2 serving as a slave of information related to the setting of an information set related to link adaptation and the determination criteria.

In addition to the foregoing, the initial value setting method for the information set related to link adaptation is also important. In the method described so far, any information set related to link adaptation may have been set as an initial value, whilst other initial value setting methods for the information set related to link adaptation and determination criterion as will be described below can be considered.

(1) Linkage to UE Category

For example, in a case of a UE category A, the terminal device 2 may set the information set A related to link adaptation as an initial value, and in a case of a UE category B, the terminal device 2 may set the information set B related to link adaptation as an initial value, respectively. That is, an information set related to link adaptation is linked to a UE category, for example, to achieve initial value setting for the information set related to link adaptation. In the case in which the UE category is A, the terminal device 2 makes the information set A related to link adaptation the initial value, and in the case in which the UE category is B, makes the information set B related to link adaptation the initial value. Then, the terminal device 2 carries out semi-static or dynamic link adaptation after the initial value setting by the above-described method or the like.

(2) Linkage to Subcarrier Spacing

For example, if a subcarrier spacing is 15 kHz, the terminal device 2 may set the information set A related to link adaptation as the initial value, and if the subcarrier spacing is 60 kHz, may set the information set B related to link adaptation as the initial value, respectively. That is, an information set related to link adaptation is linked to a subcarrier spacing, for example, to achieve initial value setting for the information set related to link adaptation. In the case in which the subcarrier spacing is 15 kHz, the terminal device 2 makes the information set A related to link adaptation the initial value, and in the case in which the subcarrier spacing is 60 kHz, makes the information set B related to link adaptation the initial value. Then, the terminal device 2 carries out semi-static or dynamic link adaptation after the initial value setting by the above-described method or the like.

(3) Linkage to Waveform

For example, the terminal device 2 sets the information set A related to link adaptation as the initial value if the waveform is CP-OFDM, sets the information set B related to link adaptation as the initial value if the waveform is DFT-s-OFDM, and sets an information set C related to link adaptation as the initial value if the waveform is a single carrier waveform other than DFT-s-OFDM, respectively. That is, an information set related to link adaptation is linked to a waveform, for example, to achieve initial value setting for the information set related to link adaptation. The terminal device 2 makes the information set A related to link adaptation the initial value in the case in which the waveform is CP-OFDM, makes the information set B related to link adaptation the initial value in the case in which the waveform is DFT-s-OFDM, and makes the information set C related to link adaptation the initial value in the case in which the waveform is a single carrier waveform other than DFT-s-OFDM, respectively. Then, the terminal device 2 carries out semi-static or dynamic link adaptation after the initial value setting by the above-described method or the like.

(4) Linkage to Transmission Mode (TM)

For example, if TM is 1 or 2, the terminal device 2 sets the information set A related to link adaptation as the initial value, and if TM is 3 or 4, sets the information set B related to link adaptation as the initial value, respectively. That is, an information set related to link adaptation is linked to a transmission mode, for example, to achieve initial value setting for the information set related to link adaptation. In the case in which TM is 1 or 2, the terminal device 2 makes the information set A related to link adaptation the initial value, and in the case in which TM is 3 or 4, makes the information set B related to link adaptation the initial value, respectively. Then, the terminal device 2 carries out semi-static or dynamic link adaptation after the initial value setting by the above-described method or the like.

(5) Linkage to RNTI

For example, in a case in which RNTI is more than or equal to A and less than B, the terminal device 2 sets the information set A related to link adaptation as the initial value, and in a case in which RNTI is more than or equal to B and less than C, sets the information set B related to link adaptation as the initial value, respectively. That is, an information set related to link adaptation is linked to RNTI, for example, to achieve initial value setting for the information set related to link adaptation. In the case in which RNTI is more than or equal to A and less than B, the terminal device 2 sets the information set A related to link adaptation as the initial value, and in the case in which RNTI is more than or equal to B and less than C, sets the information set B related to link adaptation as the initial value, respectively. Then, the terminal device 2 carries out semi-static or dynamic link adaptation after the initial value setting by the above-described method or the like.

(6) Linkage to Number of Terminal Devices being Connected to Base Station

For example, in a case in which the number of terminal devices being connected to the base station device 1 is more than or equal to A and less than B, the terminal device 2 sets the information set A related to link adaptation as the initial value, and in a case in which the number of terminal devices being connected to the base station is more than or equal to B and less than C, sets the information set B related to link adaptation as the initial value, respectively. That is, an information set related to link adaptation is linked to the number of terminal devices being connected to the base station device 1, for example, to achieve initial value setting for the information set related to link adaptation. Since it is considered that the resource conflict probability at the time of grant-free based transmission increases in a case in which the number of terminal devices being connected to the base station device 1 is large, it is considered that the terminal device 2 changes the information set related to link adaptation to an initial setting value having higher reliability, or the like. Then, the terminal device 2 carries out semi-static or dynamic link adaptation after the initial value setting by the above-described method or the like.

(7) Base Station Device 1 Notifies Terminal Device 2 at the Time of Initial Connection Response or Connection Re-Request Response The base station device 1 may notify the terminal device 2 of the initial value. For example, in a case in which there are information sets A, B, and C related to link adaptation, the base station device 1 notifies the terminal device 2 of which information set related to link adaptation is to be used as an initial setting. Here, the base station device 1 may notify the terminal device 2 of the initial setting value of an individual parameter, rather than the information set related to link adaptation. Further, the base station device 1 may notify the terminal device 2 individually, or may make a notification in common for an entire cell. Then, the terminal device 2 carries out semi-static or dynamic link adaptation after the initial value setting by the above-described method or the like.

Some examples in which, in a case of changing the information set related to link adaptation semi-statically or dynamically, the information set related to link adaptation is changed to a more appropriate information set related to link adaptation, for example, have been described above, whilst the above-described examples may be carried out reading that the grant-free based transmission is changed to the grant based transmission, or a return is made to the initial setting value. Further, the above-described contents may also be applicable to sidelink, not only uplink. Further, the above-described notification may also be a notification from an LTE cell, not only an NR cell. Furthermore, the above-described processing may be used in initial access communication.

By setting the initial value in this way, the terminal device 2 can set the initial value of the information set related to link adaptation that is used at the time of initial communication or set by parameter resetting.

2. APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or semi-permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

Application Examples for Base Station

First Application Example

Figure 23:
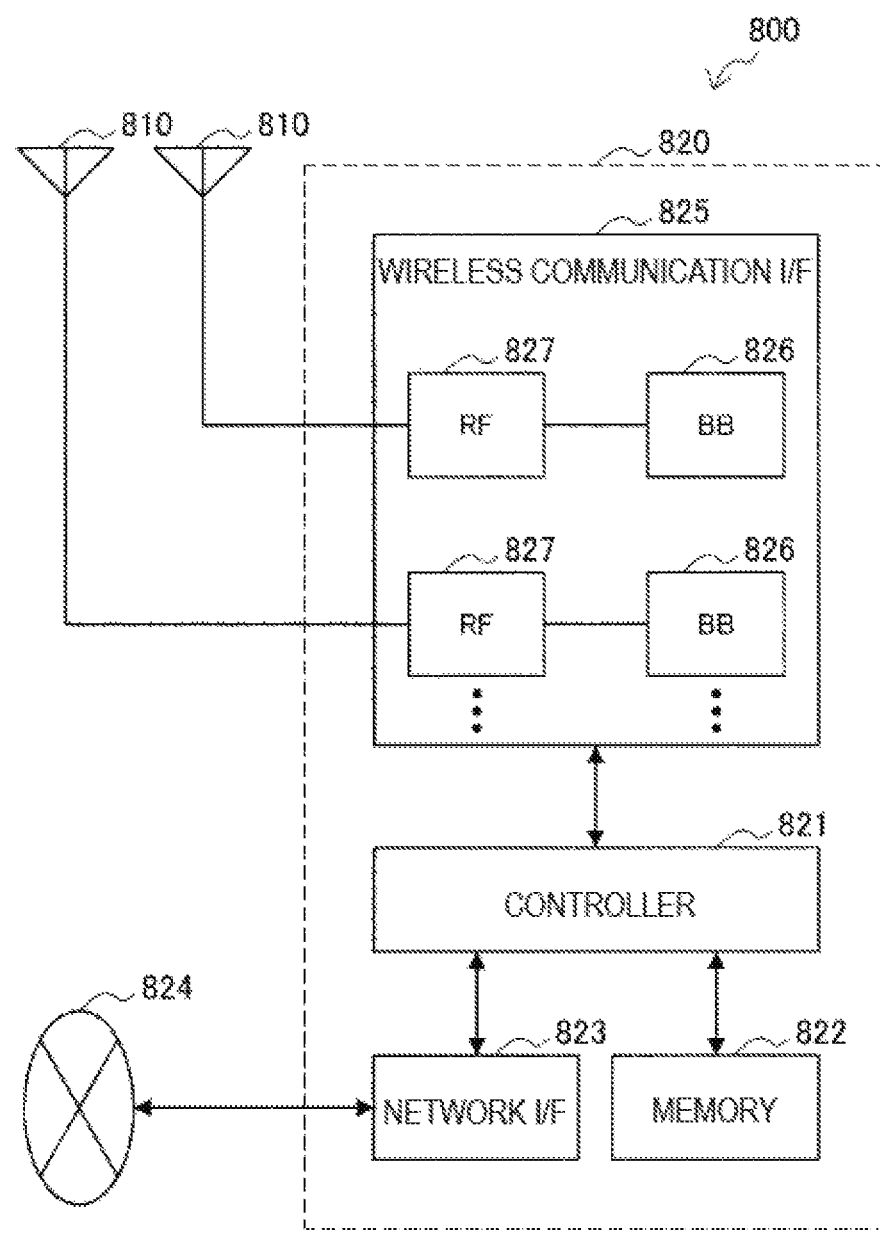
FIG. 23 is a block diagram illustrating a first example of a schematic configuration of an eNB to which the technology according to the present disclosure may be applied.

FIG. 23 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 23, and the plurality of antennas 810 may, for example, correspond to a plurality of frequency bands used by the eNB 800. It should be noted that while FIG. 23 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

Figure 25:
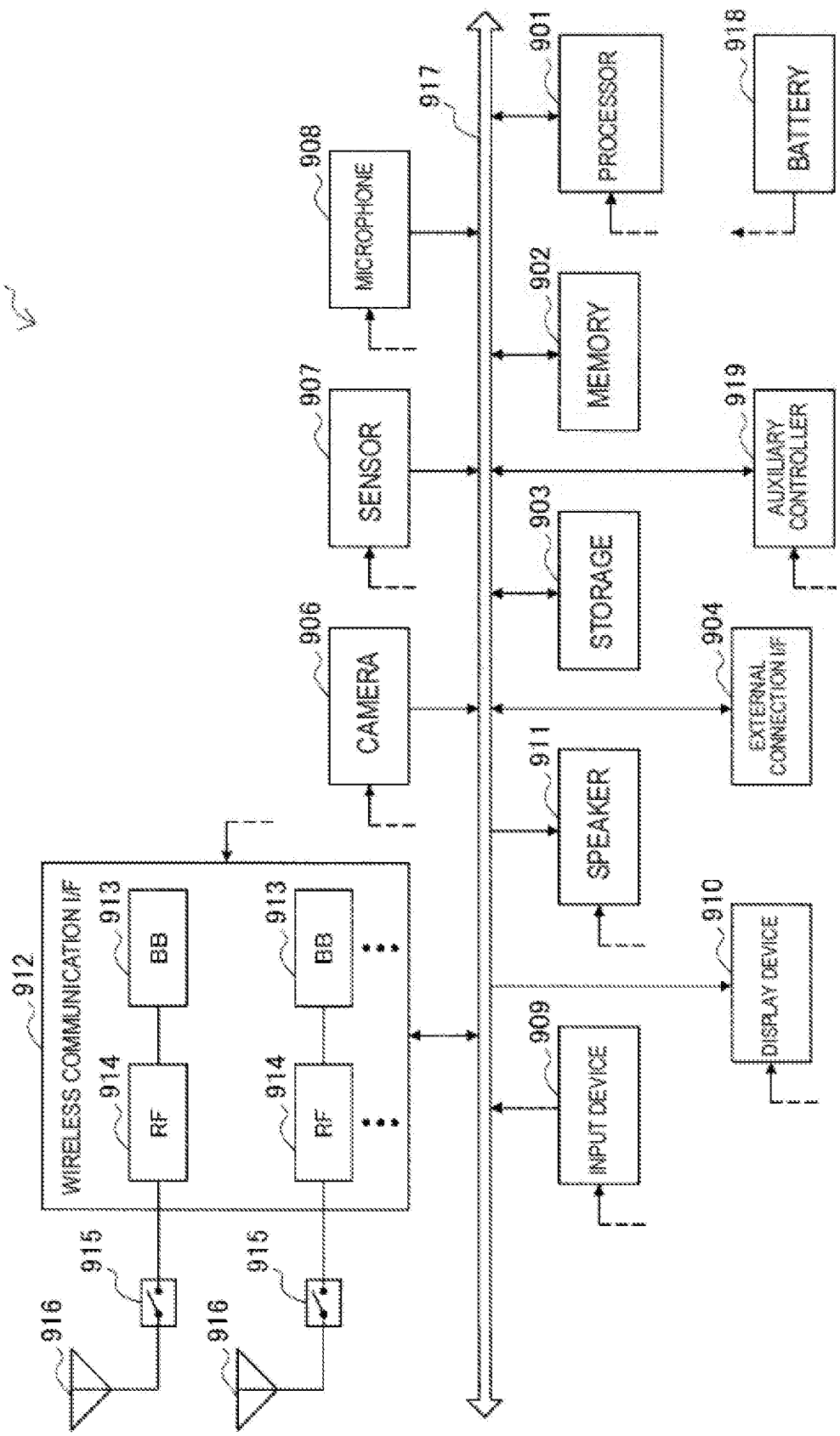
FIG. 25 is a block diagram illustrating an example of a schematic configuration of a smartphone 900 to which the technology according to the present disclosure may be applied.

The wireless communication interface 825 may include a plurality of the BB processors 826 as illustrated in FIG. 25, and the plurality of BB processors 826 may, for example, correspond to a plurality of frequency bands used by the eNB 800. Further, the wireless communication interface 825 may also include a plurality of the RF circuits 827, as illustrated in FIG. 23, and the plurality of RF circuits 827 may, for example, correspond to a plurality of antenna elements. Note that FIG. 23 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 23, one or more constituent elements (for example, the higher layer processing unit 101 and/or the control unit 103) included in the base station device 1 described with reference to FIG. 8 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 23, the receiving unit 105 and the transmitting unit 107 described with reference to FIG. 8 may be implemented in the wireless communication interface 825 (for example, the RF circuit 827). Further, the transceiving antenna 109 may be implemented in the antenna 810. In addition, an interface between the higher layer processing unit 101 and a higher node or another base station device may be mounted on the controller 821 and/or the network interface 823.

Second Application Example

Figure 24:
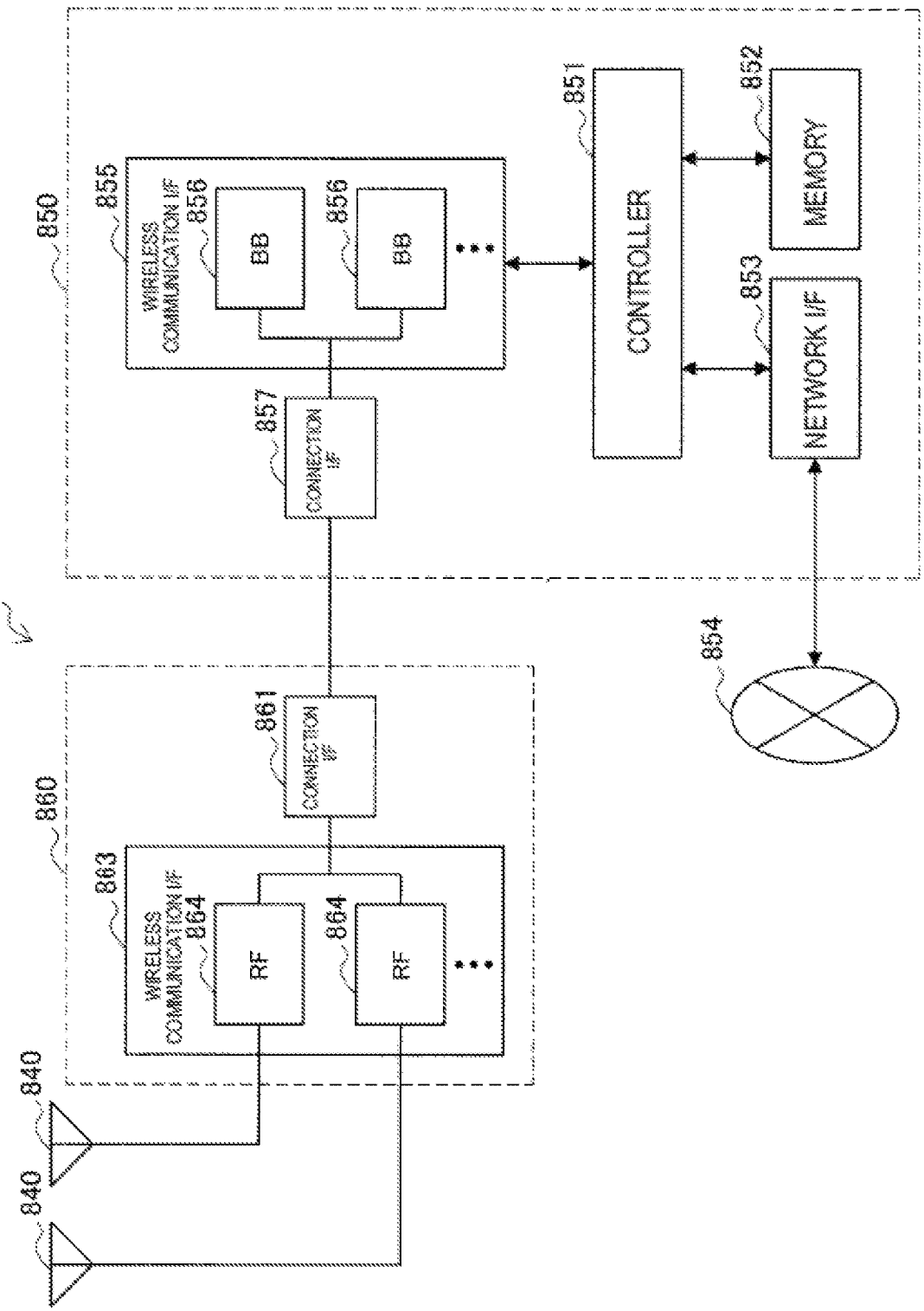
FIG. 24 is a block diagram illustrating a second example of the schematic configuration of the eNB to which the technology according to the present disclosure may be applied.

FIG. 24 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 24, and the plurality of antennas 840 may, for example, correspond to a plurality of frequency bands used by the eNB 830. Note that FIG. 24 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 23.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 23 except that the BB processor 856 is connected to an RF circuit 864 of the RRH 860 via the connection interface 857. The wireless communication interface 855 may include a plurality of the BB processors 856, as illustrated in FIG. 24, and the plurality of BB processors 856 may, for example, correspond to a plurality of frequency bands used by the eNB 830. Note that FIG. 24 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 24, and the plurality of RF circuits 864 may, for example, correspond to a plurality of antenna elements. Note that FIG. 24 illustrates an example in which the wireless communication interface 863 includes the plurality of RF circuits 864, but the wireless communication interface 863 may include the single RF circuit 864.

In the eNB 830 illustrated in FIG. 24, one or more constituent elements (for example, the higher layer processing unit 101 and/or the control unit 103) included in the base station device 1 described with reference to FIG. 8 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 825 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 24, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840. In addition, an interface between the higher layer processing unit 101 and a higher node or another base station device may be mounted on the controller 851 and/or the network interface 853.

Application Examples for Terminal Apparatus

First Application Example

FIG. 25 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 25. Note that FIG. 25 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 25. Note that FIG. 25 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 25 via a feeder line that is partially illustrated in the figure as a dashed line. The auxiliary controller 919, for example, operates a minimally necessary function of the smartphone 900 in a sleep mode.

In the smartphone 900 illustrated in FIG. 25, one or more constituent elements included in the terminal device 2 (the higher layer processing unit 201 and the control unit 203) described with reference to FIG. 9 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 25, for example, the receiving unit 205 and the transmitting unit 207 described with reference to FIG. 9 may be implemented in the wireless communication interface 912 (for example, the RF circuit 914). Further, the transceiving antenna 209 may be implemented in the antenna 916.

Second Application Example

FIG. 26 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 26. Note that FIG. 26 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 26. Note that FIG. 26 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 28 via a feeder line that is partially illustrated in the figure as a dashed line. Further, the battery 938 accumulates the electric power supplied from the vehicle.

In the car navigation 920 illustrated in FIG. 26, one or more constituent elements included in the terminal device 2 (the higher layer processing unit 201 and/or the control unit 203) described with reference to FIG. 9 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation 920. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the car navigation 920, and the wireless communication interface 933 (for example, the BB processor 934) and/or the processor 921 may execute the program. In this way, the car navigation 920 or the module may be provided as a device including the one or more constituent elements and a program causing the processor to function as the one or more constituent elements may be provided. In addition, a readable recording medium on which the program is recorded may be provided.

Further, in the car navigation 920 illustrated in FIG. 26, for example, the receiving unit 205 and the transmitting unit 207 described with reference to FIG. 9 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

3. CONCLUSION

According to an embodiment of the present disclosure as described above, the terminal device 2 capable of appropriately setting a transmission parameter at the time of the grant-free based transmission and the base station device 1 capable of notifying the terminal device 2 of information related to the transmission parameter are provided.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the processes described with reference to the flowcharts and the sequence diagrams in the present specification may not necessarily be performed in the sequences illustrated in the drawings. Several processing steps may be performed in parallel. In addition, additional processing steps may be adopted or some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

In the terminal device 2, the receiving unit 205 in the above-described embodiment corresponds to an acquisition unit in the present disclosure, and the control unit 203 corresponds to a processing unit in the present disclosure, whilst the present disclosure is not necessarily limited to that configuration. Further, in the base station device 1, the control unit 103 in the above-described embodiment corresponds to a notification unit in the present disclosure, and the receiving unit 105 corresponds to a receiving unit in the present disclosure, whilst the present disclosure is not necessarily limited to that configuration.

Further, points described in the application examples related to the base station in the above-described embodiment can also be applied to gNodeB (or gNB) similarly.

Additionally, the present technology may also be configured as below.

(1)

A wireless communication device including:

an acquisition unit configured to acquire an information set related to a transmission parameter when transmitting a resource arbitrarily selected from a predetermined resource pool to a transmission target; and a setting unit configured to set the transmission parameter using the information set.

(2)

The wireless communication device according to (1), in which the acquisition unit further acquires information related to a determination criteria when setting the transmission parameter, and the setting unit decides the information set to be used on the basis of the information related to the determination criteria.

(3)

The wireless communication device according to (2), in which the information related to the determination criteria is information related to a propagation path to the transmission target.

(4)

The wireless communication device according to (2), in which the information related to the determination criteria is information related to transmission power to the transmission target.

(5)

The wireless communication device according to any one of (1) to (4), in which the setting unit resets the information set to a predetermined initial value when a predetermined condition is satisfied.

(6)

The wireless communication device according to (5), in which the acquisition unit acquires information related to the predetermined condition.

(7)

The wireless communication device according to (5) or (6), in which the acquisition unit acquires information related to the predetermined initial value.

(8)

The wireless communication device according to any one of (1) to (7), in which the transmission target is a base station device, and the setting unit sets the transmission parameter for uplink communication to the base station device.

(9)

The wireless communication device according to any one of (1) to (7), in which the transmission target is another terminal device, and the setting unit sets the transmission parameter for sidelink communication to the other terminal device.

(10)

A wireless communication device including:

a notification unit configured to notify a terminal device of an information set related to a transmission parameter when transmitting a resource arbitrarily selected from a predetermined resource pool to a transmission target; and a receiving unit configured to receive a signal transmitted from the terminal device on the basis of the transmission parameter having been set in the terminal device using the information set.

(11)

The wireless communication device according to (10), in which the notification unit further notifies of information related to a determination criteria when setting the transmission parameter, and the receiving unit receives a signal transmitted from the terminal device on the basis of the information set decided in the terminal device on the basis of the information related to the determination criteria.

(12)
The wireless communication device according to (11), in which
the information related to the determination criteria is information related to a propagation path to the terminal device.
(13)
The wireless communication device according to (11), in which
the information related to the determination criteria is information related to transmission power from the terminal device.
(14)
The wireless communication device according to any one of (10) to (13), in which
the notification unit notifies of information related to a predetermined condition when resetting the information set to a predetermined initial value in the terminal device.
(15)
The wireless communication device according to any one of (10) to (14), in which
the notification unit notifies of the information set in uplink communication from the terminal device.
(16)
The wireless communication device according to any one of (10) to (14), in which
the notification unit notifies of the information set in sidelink communication from the terminal device.
(17)
A wireless communication method, including:
acquiring, with a processor, an information set related to a transmission parameter when transmitting a resource arbitrarily selected from a predetermined resource pool to a transmission target; and
setting, with the processor, the transmission parameter using the information set.
(18)
A wireless communication method, including:
notifying, with a processor, a terminal device of an information set related to a transmission parameter when transmitting a resource arbitrarily selected from a predetermined resource pool to a transmission target; and
receiving, with the processor, a signal transmitted from the terminal device on the basis of the transmission parameter having been set in the terminal device using the information set.
(19)
A computer program for causing a computer to execute:
acquiring an information set related to a transmission parameter when transmitting a resource arbitrarily selected from a predetermined resource pool to a transmission target; and
setting the transmission parameter using the information set.
(20)
A computer program for causing a computer to execute:
notifying a terminal device of an information set related to a transmission parameter when transmitting a resource arbitrarily selected from a predetermined resource pool to a transmission target; and
receiving a signal transmitted from the terminal device on the basis of the transmission parameter having been set in the terminal device using the information set.

REFERENCE SIGNS LIST 1 base station device
2 terminal device

The invention claimed is:
1. A wireless communication device comprising:
an acquisition circuit configured to acquire an information set related to a transmission parameter when transmitting on a resource arbitrarily selected from a predetermined resource pool to a transmission target that is a terminal device; and
a setting circuit configured to set the transmission parameter using the information set,
wherein the setting circuit resets the information set to a predetermined initial value when a predetermined condition is satisfied,
wherein the acquisition circuit further acquires information related to a determination criteria when setting the transmission parameter, and the information related to the determination criteria is information related to a propagation path to the transmission target and is information related to transmission power to the transmission target,
the setting circuit decides information set to be used on a basis of the information related to the determination criteria, and
the setting circuit sets the transmission parameter for communication to the terminal device.
2. The wireless communication device according to claim 1, wherein
the acquisition circuit acquires information related to the predetermined condition.
3. The wireless communication device according to claim 1, wherein
the acquisition circuit acquires information related to the predetermined initial value.
4. The wireless communication device according to claim 1, wherein
the transmission target is a base station device, and
the setting circuit sets the transmission parameter for uplink communication to the base station device.
5. A wireless communication device comprising:
a notification circuit configured to notify a terminal device of an information set related to a transmission parameter when transmitting on a resource arbitrarily selected from a predetermined resource pool to a transmission target that is a terminal device; and
a receiver configured to receive a signal transmitted from the terminal device on a basis of the transmission parameter having been set in the terminal device using the information set,
wherein the information set is reset to a predetermined initial value when a predetermined condition is satisfied,
the notification circuit further notifies of information related to a determination criteria when setting the transmission parameter, and the information related to the determination criteria is information related to a propagation path to the terminal device and is information related to transmission power from the terminal device, and
the receiver receives a signal transmitted from the terminal device on a basis of the information set decided in the terminal device on a basis of the information related to the determination criteria, and
the notification circuit notifies the terminal device of the information set, wherein the information set is received in communication from the terminal device.

6. The wireless communication device according to claim 5, wherein
the notification circuit notifies the terminal device of the information set, wherein the information se is received in uplink communication from the terminal device.

7. A wireless communication method, comprising:
acquiring, with processing circuitry, an information set related to a transmission parameter when transmitting on a resource arbitrarily selected from a predetermined resource pool to a transmission target device that is a terminal device; and
setting, with the processing circuitry, the transmission parameter using the information set,
wherein the information set is reset to a predetermined initial value when a predetermined condition is satisfied,
acquiring information related to a determination criteria when setting the transmission parameter, and the information related to the determination criteria is information related to a propagation path to the transmission target and is information related to transmission power to the transmission target,
deciding the information set to be used on a basis of the information related to the determination criteria, and
setting the transmission parameter for communication to the terminal device.

8. A wireless communication method, comprising:
notifying, with processing circuitry, a terminal device of an information set related to a transmission parameter when transmitting on a resource arbitrarily selected from a predetermined resource pool to a transmission target device that is a terminal device; and
receiving, with the processing circuitry, a signal transmitted from the terminal device on a basis of the transmission parameter having been set in the terminal device using the information set,
wherein the information set is reset to a predetermined initial value when a predetermined condition is satisfied,
notifying of information related to a determination criteria when setting the transmission parameter, and the information related to the determination criteria is information related to a propagation path to the terminal device and is information related to transmission power from the terminal device, and
receiving a signal transmitted from the terminal device on a basis of the information set decided in the terminal device on a basis of the information related to the determination criteria, and
notifying the terminal device of the information set, wherein the information set is received in communication from the terminal device.

9. A non-transitory computer-readable storage medium storing computer executable instructions thereon, which when executed by circuitry, cause the circuitry to perform a method comprising:
acquiring an information set related to a transmission parameter when transmitting a resource arbitrarily selected from a predetermined resource pool to a transmission target that is a terminal device; and
setting the transmission parameter using the information set,
wherein the information set is reset to a predetermined initial value when a predetermined condition is satisfied,
acquiring information related to a determination criteria when setting the transmission parameter, and the information related to the determination criteria is information related to a propagation path to the transmission target and is information related to transmission power to the transmission target,
deciding the information set to be used on a basis of the information related to the determination criteria, and
setting the transmission parameter for communication to the terminal device.

10. A non-transitory computer-readable storage medium storing computer executable instructions thereon, which when executed by circuitry, cause the circuitry to perform a method comprising:
notifying a terminal device of an information set related to a transmission parameter when transmitting on a resource arbitrarily selected from a predetermined resource pool to a transmission target that is a terminal device; and
receiving a signal transmitted from the terminal device on a basis of the transmission parameter having been set in the terminal device using the information set,
wherein the information set is reset to a predetermined initial value when a predetermined condition is satisfied,
notifying of information related to a determination criteria when setting the transmission parameter, and the information related to the determination criteria is information related to a propagation path to the terminal device and is information related to transmission power from the terminal device, and
receiving a signal transmitted from the terminal device on a basis of the information set decided in the terminal device on a basis of the information related to the determination criteria, and
notifying the terminal device of the information set, wherein the information set is received in communication from the terminal device.

* * * * *